(12) United States Patent
Ikezoye et al.

(10) Patent No.: US 12,314,315 B2
(45) Date of Patent: May 27, 2025

(54) DYNAMIC ADJUSTMENT OF PARAMETERS FOR MEDIA CONTENT IDENTIFICATION

(71) Applicant: Audible Magic Corporation, Los Gatos, CA (US)

(72) Inventors: Vance Ikezoye, Los Gatos, CA (US); Erling Wold, San Francisco, CA (US)

(73) Assignee: Audio Magic Corporation, Los Gatos, CA (US)

( * ) Notice: Subject to any disclaimer, the term of this patent is extended or adjusted under 35 U.S.C. 154(b) by 809 days.

(21) Appl. No.: 16/940,296

(22) Filed: Jul. 27, 2020

(65) Prior Publication Data

US 2022/0027407 A1    Jan. 27, 2022

(51) Int. Cl.

| | | |
|---|---|---|
| G06F 16/00 | (2019.01) | |
| G06F 7/00 | (2006.01) | |
| G06F 16/635 | (2019.01) | |
| G06F 16/65 | (2019.01) | |
| G06F 16/68 | (2019.01) | |
| G06F 16/683 | (2019.01) | |
| G06F 21/10 | (2013.01) | |

(52) U.S. Cl.
CPC ............ *G06F 16/65* (2019.01); *G06F 16/637* (2019.01); *G06F 16/683* (2019.01); *G06F 16/686* (2019.01); *G06F 21/10* (2013.01)

(58) Field of Classification Search
CPC ...... G06F 16/65; G06F 16/637; G06F 16/683; G06F 16/686; G06F 21/10
USPC ....................................................... 707/737
See application file for complete search history.

(56) References Cited

U.S. PATENT DOCUMENTS

| | | |
|---|---|---|
| 5,918,223 A | 6/1999 | Blum et al. |
| 6,834,308 B1 | 12/2004 | Ikezoye et al. |
| 6,968,337 B2 | 11/2005 | Wold |
| 7,363,278 B2 | 4/2008 | Schmelzer et al. |
| 7,562,012 B1 | 7/2009 | Wold et al. |
| 8,006,314 B2 | 8/2011 | Wold |
| 8,130,746 B2 | 3/2012 | Schrempp |
| 8,199,651 B1 | 6/2012 | Schrempp et al. |
| 8,332,326 B2 | 12/2012 | Schrempp et al. |
| 8,972,481 B2 | 3/2015 | Schrempp et al. |
| 9,081,778 B2 | 7/2015 | Garside et al. |
| 9,679,579 B1* | 6/2017 | Lyon ....................... G10L 25/51 |
| 9,800,576 B2 | 10/2017 | Schrempp et al. |
| 10,091,263 B2 | 10/2018 | Schrempp et al. |

(Continued)

*Primary Examiner* — Raquel Perez-Arroyo
(74) *Attorney, Agent, or Firm* — LOWENSTEIN SANDLER LLP

(57) ABSTRACT

A system receives a media content item and analyzes the media content item to identify copyrighted material contained therein. Analyzing the media content item includes determining an initial interval for selecting segments of the media content item to be analyzed, generating a first digital fingerprint of a first segment of the media content item, comparing the first digital fingerprint to at least a first subset of a plurality of digital fingerprints of a first plurality of known works to determine whether the first digital fingerprint matches one of the plurality of digital fingerprints of the first plurality of known works, and determining an updated interval for selecting the segments of the media content item to be analyzed based on whether or not a match was found between the first digital fingerprint and one of the plurality of digital fingerprints of the first plurality of known works.

27 Claims, 9 Drawing Sheets

(56) References Cited

U.S. PATENT DOCUMENTS

| | | |
|---|---|---|
| 10,599,702 B2 | 3/2020 | Ikezoye et al. |
| 2012/0078894 A1* | 3/2012 | Jiang ................... G06F 16/683 |
| | | 707/723 |
| 2016/0210356 A1* | 7/2016 | Kariyappa ............ G06F 16/683 |
| 2017/0372142 A1 | 12/2017 | Bilobrov |
| 2018/0349494 A1* | 12/2018 | Zhao .................... G06F 16/634 |
| 2019/0028766 A1 | 1/2019 | Wold et al. |
| 2019/0102458 A1* | 4/2019 | Roblek ................... G06N 3/08 |
| 2019/0141391 A1* | 5/2019 | McMillan .............. H04N 21/84 |
| 2019/0205467 A1 | 7/2019 | Wold et al. |
| 2020/0058088 A1* | 2/2020 | Davis .................... G06Q 20/22 |
| 2020/0065503 A1* | 2/2020 | Ellingson ............ H04L 63/0428 |
| 2020/0160091 A1 | 5/2020 | Hardee et al. |
| 2020/0273123 A1 | 8/2020 | Ikezoye et al. |
| 2020/0275167 A1 | 8/2020 | Ikezoye et al. |
| 2021/0357451 A1 | 11/2021 | Wold |

* cited by examiner

DYNAMIC ADJUSTMENT OF PARAMETERS FOR MEDIA CONTENT IDENTIFICATION

TECHNICAL FIELD

This disclosure relates to the field of media content identification, and in particular to dynamically adjusting one or more parameters during media content identification.

BACKGROUND

A large and growing population of users enjoy entertainment through the consumption of media content items, including electronic media, such as digital audio and video, images, documents, newspapers, podcasts, etc. Media content sharing platforms provide media content items to consumers through a variety of means. Users of the media content sharing platform may upload media content items (e.g., user generated content (UGC)) for the enjoyment of the other users. Some users upload content to the media content sharing platform that is or includes at least portions of a known work (e.g., copyrighted music) of a content owner. An entity seeking to identify uploads of or containing protected, known works (e.g., performances, compositions, albums, songs, etc.) will generally have to review uploaded media content items (e.g., UGC) to determine whether those uploaded media content items contain some or all of such known works. Once the protected works are identified, the entity makes a determination of whether the works are i) unauthorized, in which case the media may be blocked from distribution or the work muted or deleted; or are ii) authorized and licensed, in which case the works are allowed to be distributed according to the terms of the licensing agreement, and reports may be generated on the usage for delivery to the rights holders.

The process of evaluating each and every media content item uploaded by users and/or evaluating the entire available content of a media content supplier (e.g., a media content sharing platform) to identify particular known works contained therein is time consuming and requires a substantial investment into computing/processing power and communication bandwidth. Moreover, the amount of UGC that is uploaded to media content sharing platforms continues to grow, both in terms of the number of instances of uploaded UGC and in the duration or length of each instance of UGC. As a result, the amount of resources that are used to process UGC and identify instances of copyrighted material within such UGC is continually increasing.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
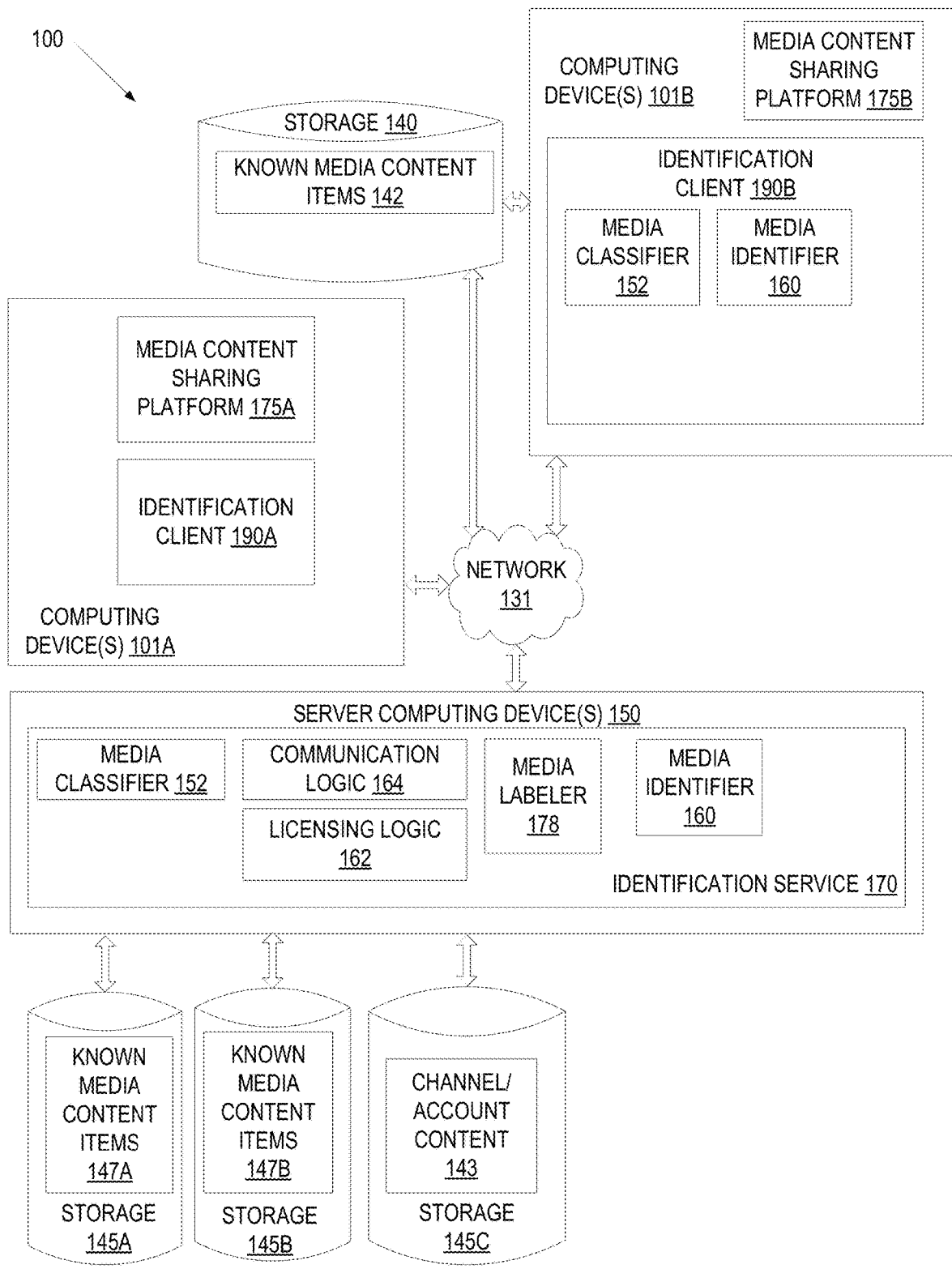
FIG. 1 is a block diagram illustrating a network environment in which embodiments of the present disclosure may operate.

Embodiments described herein relate to systems and methods for identifying the contents of media content items (e.g., UGC). For example, embodiments relate to identifying copyrighted material contained within media content items (e.g., UGC). Embodiments further relate to systems and methods for automatically adjusting the parameters used to analyze media content items (e.g., UGC). The parameters used to analyze media content items (e.g., UGC) to perform identification of the contents of the media content items are automatically adjusted in embodiments based on a number of hits or matches between sampled portions of the media content items and portions of known works (or other known media content items) and/or based on additional information such as information about a channel or user account associated with the media content items, information on a length of the media content items, information about a social media sharing platform onto which the media content items were uploaded, information about how much music and/or other specific types of content is contained within the media content items, information about interaction between video, audio and/or metadata of the media content items, and/or other information.

A media content item (e.g., UGC) may be audio (e.g., a song or album), an image, a video, text, or other work. Media content items may be files (e.g., audio files having formats such as WAV, AIFF, AU, FLAC, ALAC, MPEG-4, MP3, Opus, Vorbis, AAC, ATRAC, WMA, and so on, or video files having formats such as WebM, Flash Video, F4V, Vob, Ogg, Dirac, AVI, QuickTime File Format, Windows Media Video, MPEG-4, MPEG-1, MPEG-2, M4V, SVI, MP4, FLV, and so on). Media content items may also be live streams of video and/or audio media. Media content items may correspond to or include UGC in embodiments. For example, media content items may be uploads to user accounts and/or channels on Twitch®, Youtube®, Facebook®, and so on.

Today, many pieces of content are available to be viewed both offline and online through a diverse collection of media content sharing platforms. In one common case, a media content sharing platform will monetize an instance of media content during the presentation of the content to the end user. Monetization of media content includes displaying other content such as advertisements and/or promotional media alongside, before, or after presenting the media content item. Interested parties, such as a content sharing platform, a user uploading the media content item, a media content item owner, or a media content item publisher may wish to determine whether the media content item is or includes known material (e.g., a known work, other known media content items) so that licensing rates may be applied for the media content item and/or the media content item can be removed from the media content sharing platform. Additionally, interested parties may be interested in determining classifications of unknown media content items (e.g., whether a media content item contains foreground music or background music or no music, whether a media content item includes a movie or a torso of a speaking person, etc.). Foreground music and background music are two categories of music that may be determined for media content items that include both audio and video and/or for media content items that contain only audio, and whether the music is foreground or background may be based on the relationship between the music and other audio and/or the relationship between the audio and video components of the media content item. Foreground music refers to music where the music is the focus of a listener's attention, e.g. a video of a concert performance. Background music refers to music where the music is audible, but not the focus of the listener's attention, e.g. a scene with dialog that includes underscoring or audio containing both speech and music, where the speech is louder than the music.

A media content identification service may receive the media content item for processing locally (to the media content sharing platform) or remotely (from the media content sharing platform) over a network. A local service may incur substantial, costly computation and storage expenses to process requests for identification. A remote service may incur the computation and storage expenses, and may further incur costly bandwidth expenses to process requests for identification. The greater the number of identification requests or attempts that are performed, the greater the utilization of processor and/or bandwidth resources, and the greater the overall cost.

Popularity of media content sharing platforms is ever increasing. The user bases for popular media content sharing platforms have already expanded to over a billion users. An active set of these users is uploading user generated content. User generated content (UGC) may include the work or material of another that is subject to copyright protections (e.g., video or audio known works and/or other known material). Every new instance of user generated content generally should be analyzed against known works licensed for use by a platform hosting the UGC (e.g., to determine whether portions of such UGC contain portions of copyrighted material). A media content identification service can receive billions of transactions each and every month, where each transaction involves the analysis of all or a portion of a media content item. For example, each transaction can involve an attempt to match a 5-30 second segment of a media content item (i.e., UGC) with a portion of a known work (e.g., a 5-30 second portion of a copyrighted musical performance). To determine such a match, a digital fingerprint of the 5-30 second portion of the known work may be generated, and may be compared to digital fingerprints of every work (e.g., copyrighted performance) stored in a database. Thus, even performing a single match for a single snippet of UGC can take considerable processing power. Moreover, many identification transactions are generally performed for even just a single media content item.

The magnitude of transactions received can lead to increased costs and even delayed processing of requests while preceding requests are processed. Today's solutions to media content item identification and licensing can be costly and time consuming. For example, a media content sharing platform which seeks to determine if a new instance of user generated content should be removed or flagged for licensing generally sends the recently uploaded user generated content (or digital fingerprints of such) to the media content identification service for each and every instance of uploaded content. A digital fingerprint of the UGC is generally created, and that digital fingerprint is sampled to determine digital fingerprint segments of some length (e.g., 5, 10, 15, 20, 25 or 30 seconds) at a fixed interval (e.g., every 5 seconds, 10 seconds, 15 seconds, 20 seconds, 25 seconds, 30 seconds, 60 seconds, 2 minutes, 4 minutes, 5 minutes or 10 minutes) that are to be tested (e.g., compared to digital fingerprints of known media content items). The simplest pattern of sampling the digital fingerprint for testing is a regular grid. Alternatively, The UGC may be sampled such that a digital fingerprint is generated for a segment of some length (e.g., 5, 10, 15, 20, 25 or 30 seconds) at a fixed interval (e.g., every 5 seconds, 10 seconds, 15 seconds, 20 seconds, 25 seconds, 30 seconds, 60 seconds, 2 minutes, 4 minutes, 5 minutes or 10 minutes) within the UGC. For example, a digital fingerprint of a 5 second segment may be generated every 10-30 seconds in the UGC. In either use case, for an hour long media content item uploaded by a user, there may be about 120-360 identification transactions. For each such identification transaction, a segment of the user generated content may be processed for a match against every segment of every registered known work in a reference database of the identification service.

To reduce the computing resource cost and/or processing time for identification of each media content item, a media content identification service may implement dynamic throttling of media content item identification. To perform identification of a media content item, the media content identification service may begin by sampling and testing segments of the media content item (or of a digital fingerprint of the media content item) at an initial frequency or interval, starting from a beginning of the media content item or from segments at one or more specified offsets into the media content item. If no matches are found for a first segment of the media content item (which may be at the start of the media content item or at another location in the media content item) or for the first few segments of the media content item, then the frequency of sampling may be reduced (i.e., the interval between sampled segments may be increased) and/or a resolution of the matches may be reduced (e.g., the size requirement for a match may increase). If matches are found, then the frequency of sampling may be increased (i.e., the interval between sampled segments may be reduced) and/or a resolution of the matches may be increased (e.g., the size requirement for a match may decrease). Accordingly, the first lookups for the first sampled segments determine how many subsequent lookups are performed as well as the locations in the media content item of those subsequent lookups. Thus, the number of identification transactions or operations that are used for a particular UGC may vary based on the number of matches that are found to known media content items. In the aggregate over many media content items, such dynamic sampling and identification of the media content items provides the same or greater level of accuracy of identifying copyrighted works contained within the media content items while also reducing the overall number of identification requests (and thus the bandwidth and/or processor resource utilization associated with identifying copyrighted material contained within the media content items).

Observation of many media content items has shown that media content items having music (e.g., copyrighted music) anywhere are more likely to have music throughout the media content items. Thus, a testing interval may be dynamically decreased (testing frequency may be dynamically increased) for testing a remainder of media content items for which copyrighted music has been identified for one or more initially tested segments of the media content items.

Observation has further shown that media content items that have no copyrighted music at initially tested segments of the media content items are more likely to not contain any music. Thus, a testing interval may be dynamically increased (testing frequency may be dynamically decreased) for testing a remainder of media content items for which no copyrighted music has been identified for one or more initially tested segments of the media content items. A decision on what segments (e.g., what time offsets) in a media content item to test initially may be made based on statistical observation of historical data in embodiments, and may be affected by file size and/or other information.

Observation has further shown that media content items having a certain length (e.g., short media content items of 5-10 minutes or less) have an increased chance of containing copyrighted music. Thus, a small testing interval may be dynamically set for analyzing short media content items (e.g., those that are 5-10 minutes long or less).

Observation has further shown that some user accounts and channels of media content sharing platforms are more likely to contain copyrighted music than other user accounts and channels of the media content sharing platforms. Thus, a testing interval for a media content item may be dynamically set based on an identity of a user account or channel that the media content item is associate with.

Furthermore, risk and missed licensing opportunities associated with failure to identify copyrighted material in media content items is proportional to the popularity of such media content items. The greater number of views of the media content items, the greater the risk and the greater the loss of a licensing opportunity. Accordingly, a testing interval for a media content item may be based on the number of views of that media content item. For example, a first identification analysis of a media content item may be performed when it is uploaded, and a second more thorough identification analysis may be performed once the media content item has reached a threshold number of views.

In embodiments, external data or information a media content item (e.g., other than a body of the media content item) is used to determine and/or update a testing recipe for the media content item. For example, data about the media content item (e.g., length of the media content item, channel or user account associated with the media content item, previous matches or lack of matches to copyrighted material for the media content item, comments, titles and/or categories assigned to the media content item by a platform and/or user, etc.) can be used both to select an initial testing recipe and to update testing parameters (e.g., such as a testing interval, a minimum match length requirement, a segment size, etc.) dynamically during testing of the media content item.

In one embodiment, a media content sharing platform (e.g., such as YouTube®, Vimeo®, Wistia®, Vidyard®, SproutVideo®, Daily Motion®, Facebook®, etc.) provides a transaction request for a media content item which has been uploaded by a user of the media content sharing platform. The transaction request may include a first digital fingerprint of a first segment of the media content item, a copy of the first segment, the entire media content item, a digital fingerprint of the entire media content item (which is divisible into digital fingerprints of individual segments and/or can be sampled to determine portions of the digital fingerprint that correspond to particular segments of the media content item), or digital fingerprints of all segments of the media content sharing platform.

In one embodiment, an identification service receives a transaction request to identify any copyrighted material in a media content item. The identification service then analyzes the media content item to identify copyrighted material contained therein. Analyzing the media content item in one embodiment includes determining an initial interval for selecting segments of the media content item to be analyzed; determining a first digital fingerprint of a first segment of the media content item; comparing the first digital fingerprint to at least a first subset of a plurality of digital fingerprints of a first plurality of known works and/or other known media content items to determine whether the first digital fingerprint matches one of the plurality of digital fingerprints of the first plurality of known works and/or other known media content items; determining an updated interval for selecting the segments of the media content item to be analyzed based on whether or not a match was found between the first digital fingerprint and one of the plurality of digital fingerprints of the first plurality of known works and/or other known media content items; determining a second digital fingerprint of a second segment of the media content item, wherein the second segment is separated from the first segment by the updated interval; and comparing the second digital fingerprint to at least a second subset of the plurality of digital fingerprints of the first plurality of known works and/or other known media content items to determine whether the second digital fingerprint matches one of the plurality of digital fingerprints of the first plurality of known works and/or other known media content items. The transaction request may have included a digital fingerprint of the entire media content item (or one may be generated responsive to receiving the transaction request for the media content item, which may be included in the transaction request). Determining the first and second digital fingerprints may include determining portions of the digital fingerprint that correspond to particular segments of the media content item, those determined portions of the digital fingerprint constituting the first digital fingerprint and second digital fingerprint. The first and second digital fingerprints may not actually be distinct digital fingerprints, but may simply be portions of the digital fingerprint of the entire media content item that are examined.

Embodiments are discussed herein with regards to adjusting testing parameters (e.g., such as a testing interval/frequency) for testing whether portions or segments of an unidentified media content item (e.g., UGC) contains portions of known media content items (e.g., of known works such as copyrighted performances). However, the same dynamic testing methodology may also be applied to unidentified media content items to determine how to sample those unidentified media content items in order to make other determinations in addition to or instead of determinations of whether copies of known material is included therein. For example, the techniques described herein may similarly be used to dynamically adjust a testing interval for sampling of an unknown media content item to determine a classification of the sampled segments of the unknown media content item. For example, sampled segments may be processed using a machine learning model trained as a classifier, where the machine learning model outputs a classification of the sampled segments. Examples of such a classification includes whether the sampled segment contains music, whether the sampled segment contains foreground music, background music or no music, whether the sampled segment contains a copy of a video portion of a movie, whether the sampled segment contains a talking head, and so on. In one example, the sampling frequency may be increased (sampling interval may be decreased) if a sampled segment is classified as containing music, and the sampling frequency may be decreased (sampling interval may be increased) if a sampled segment is classified as not containing music.

In some embodiments, an adult content identification service may be performed using the methodology described herein. The adult content identification service may use a database of known adult content (e.g., music with explicit lyrics, R rated movies, X rated movies, etc.), and may compare digital fingerprints of unknown media content items (e.g., audio digital fingerprints and/or video digital fingerprints) to digital fingerprints of such known adult content to identify any matches. The generation and comparison of digital fingerprints may be performed as is described in greater detail below. However, for the adult content identification service, the library of known media content items to which an unknown media content item is compared may be different from the library of known media content items that is used for a standard identification service. The testing recipe that is used may be selected, and adjustments to the testing recipe that are to be made, may be determined using the techniques described herein below. In alternative embodiments, the adult content identification service may perform identification of unknown media content items a fixed testing recipe that is not adjusted dynamically.

In some embodiments, a media content sharing platform explicitly requests that adult content identification be performed on unknown media content items. Alternatively, an identification system may determine whether to perform standard content identification or adult content identification based on information about an unknown media content item. For example, if the media content item includes metadata specifying it as being for children, or if the unknown media content item in question was uploaded to a channel for children, then processing logic may automatically determine that adult content identification should be performed. In one embodiment, processing logic analyzes the advertising associated with a media content item. Processing logic then determines based on the analysis whether or not the advertising is targeted at children. If so, then the media content item may perform adult media content identification on the unknown media content item. Adult media content identification may include sampling the unknown media content item and comparing some or all segments of the unknown media content item to a set of known media content items that contain adult subject matter (e.g., using an adult content identification service). For example, processing logic may generate a digital fingerprint of the unknown media content item, and compare portions of the digital fingerprint that are of specific segments of the unknown media content item to digital fingerprints of segments of known adult content. In some embodiments, processing logic may then adjust the sampling rate and/or other testing parameters (e.g., of a testing recipe) based on hits and/or misses for segments of the media content item to the known adult content. Alternatively, processing logic may not adjust the sampling rate (or otherwise adjust the testing recipe).

In some embodiments, a content identification service compares digital fingerprints of an unidentified media content item to digital fingerprints generated from content uploaded to a first content platform (e.g., a first media content sharing platform) The first content platform may include terms of use that grant the first content platform exclusivity for the UGC uploaded thereto. Accordingly, digital fingerprints may be generated of such content, whether or not the identity of that content is known. UGC uploaded to other content platforms may then be sampled, and the digital fingerprints of such UGC may be compared to digital fingerprints of the content on the first content platform to identify any matches therebetween. Testing parameters may be adjusted dynamically using the methodologies discussed herein.

Turning now to the figures, FIG. 1 is a block diagram illustrating a network environment 100 in which embodiments of the present disclosure may operate. In one embodiment, network environment 100 includes one or more computing devices (e.g., computing device 101A, computing device 101B, and server computing device 150) connected via network 131. Any number of computing devices 101A-B can communicate with each other and/or with server computing device 150 through network 131. The network 131 can include a local area network (LAN), a wireless network, a telephone network, a mobile communications network, a wide area network (WAN) (e.g., such as the Internet) and/or similar communication system. The network 131 can include any number of networking and computing devices such as wired and/or wireless devices.

The computing devices 101A-B and server computing device 150 may include one or more physical machines and/or virtual machines hosted by physical machines. The physical machines may include rackmount servers, desktop computers, and/or other computing devices. In one embodiment, the computing devices 101A-B and/or server computing device 150 include a virtual machine managed and provided by a cloud service provider system. Each virtual machine offered by a cloud service provider may be hosted on a physical machine configured as part of a cloud. Such physical machines are often located in a data center. A cloud provider system and cloud may be provided as an infrastructure as a service (IaaS) layer. One example of such a cloud is Amazon's® Elastic Compute Cloud (EC2®).

Computing devices 101A-B each host a media content sharing platform 175A-B. Computing devices 101A-B may include local storage (not shown) for storing an Operating System (OS), programs, and/or specialized applications to be run on the computing device. Computing devices 101A-B may further include storage for storing media content items of the media content sharing platforms 175A, 175B. The media content items may also be stored in attached or remote storage, such as in a storage area network (SAN), a network attached storage (NAS), or a cloud storage platform (e.g., a storage as a service provided by a cloud service platform). In an example, computing device 101B is connected to storage 140, which stores information on known media content items 142, which may be a subset of a larger store or database of known media content items 147A-B.

Media content sharing platforms 175A-B receive and store user uploads of user generated content and other content. User generated content (UGC) includes any form of content, such as images, videos, text and audio, that has been posted by users on media content sharing platforms (i.e. online platforms) such as social media and wikis. Such UGC may then be accessible to other users. User generated content includes media content items that have been uploaded to the media content sharing platform. Such media content items are unidentified media content items on upload, and may include copyrighted material in many instances.

The media content sharing platforms 175A-B may engage with a media content identification service 170 hosted by server computing device 150. After a media content item is uploaded to the media content sharing platform 175A-B, the computing device 101A, 101B may send one or more identification request for the media content item to the server computing device 150 for identification by identification service 170. An identification request may include the media content item, one or more segments of the media content item (e.g., provided as a single file or multiple files), a digital fingerprint of the media content item, digital fingerprints of one or more segments of the media content item, an identification of an account or channel associated with the media content item (e.g., a channel to which the media content item was posted or a user account on which the media content item was posted) and/or other information related to the media content item.

Digital fingerprints are compact digital representations of a media content item (or a segment of a media content item) extracted from a media content item (audio or video) which represent characteristics or features of the media content item (or segment of the media content item) with enough specificity to uniquely identify the media content item (or segment of the media content item). Fingerprinting algorithms encapsulate features such as frame snippets, motion and music changes, camera cuts, brightness level, object movements, loudness, pitch, brightness, spectral bandwidth, energy in one or more spectral bands, spectral steadiness, Mel-frequency cepstral coefficients (MFCCs), and so on. The fingerprinting algorithm that is used may be different for audio media content items and video media content items.

Examples of other information related to the media content item, which may be included in the identification request, includes metadata such as an indication of a type or class of channel to which the media content item was posted (e.g., a music channel, a gaming channel, a news channel, etc.), a transcription of the media content item (e.g., lyrical information), metadata indicating a length of the media content item, metadata indicating a date and time of an upload of the media content item, and so on. The identification request may be for one or more particular segment(s) of the uploaded media content item, or may be for an entirety of the media content item. For example, the media content sharing platform may determine segments of the media content item to be tested, and may send separate identification requests to the identification service 170 for each of the segments, where each identification request includes a different segment of the media content item and/or a digital fingerprint of a different segment of the media content item. In another example, the media content sharing platform 175A, 175B may send a single identification request for an entire media content item.

In some embodiments, the computing device or devices 101A, 101B host a local identification client 190A, 190B that is associated with the identification service 170. In some embodiments, the media content sharing platform 175A, 175B sends one or more identification request for an uploaded media content item to the identification client 190A, 190B for identification. The identification request may be for a segment of a media content item, multiple segments of a media content item, or an entirety of a media content item, and may include any of the aforementioned data. The identification client 190A, 190B may then perform one or more operations locally at the computing devices 101A, 101B, such as generating digital fingerprints, processing one or more segments of the media content item using a trained machine learning model to classify those segments as containing or not containing music, processing the media content item using a trained machine learning model to determine an amount of music in the media content item and/or checking the digital fingerprints against a local database of digital fingerprints of known media content items. Examples of machine learning models that may be used include neural networks (e.g., deep neural networks, convolutional neural networks), support vector machines, decision trees (e.g., random forests), and so on.

The identification client 190A, 190B may additionally or alternatively forward the transaction request (or a new request) on to identification service 170. In one example, identification client 190A, 190B may receive an identification request to identify any copyrighted material in an entire media content item, may determine one or more segments of the media content item to be tested, and may send separate requests to identification service 170 for each of those segments.

Identification client 190A-B may be configured to extract information from unidentified media content items and to send such extracted information to identification service 170 and to otherwise communicate with identification service 170. Such extracted content may include lyrical content, one or more digital fingerprints, one or more features (e.g., feature vectors), and so on. Identification client 190A-B may alternatively or additionally be configured to send unidentified media content items or portions thereof to identification service 170. Additionally, or alternatively, the identification client 190A, 190B may process unidentified media content items to determine whether those unidentified media content items contain music and/or to determine an amount of music contained in the unidentified media content items. In some embodiments, identification client 190A, 190B performs additional operations and/or sends data to identification service if the unidentified media content items contain music or a threshold amount of music. Identification clients 190A-B may optionally include a media classifier 152 and/or a media identifier 160 in embodiments.

Server computing device 150 includes a media content identification service 170 that can identify copyrighted material contained within media content items. Original media content items (e.g., known copyrighted works such as recorded performances) may be registered to the identification service 170, which may include generating a plurality of segments of the original media content item and/or generating digital fingerprints for each of the plurality of segments. In one example, a digital fingerprint of an entire media content item of a known work may be generated. The digital fingerprint may include a different smaller digital fingerprint (e.g., feature vector or set of features) for each timestamp of the known media content item. The digital fingerprint may be divided into smaller digital fingerprints of segments of the known media content item as is convenient for comparison to digital fingerprints of unidentified media content items.

In an embodiment, the media content identification service 170 includes a media identifier 160, a licensing logic 162, a communication logic 164, a media classifier 152, and a media labeler 178. Alternatively, the identification service 170 may not include some of these components and/or the functionality of some of these components may be combined.

The server computing device 150 may communicate with storages 145A-C that store known media content items 147A-B and/or channel/account content 143. The storages 145A-C can be magnetic storage units, optical storage units, solid state storage units, storage servers, or similar storage units. The storages 145A-C can be monolithic devices or a distributed set of devices. A 'set,' as used herein, refers to any positive whole number of items including one. In some embodiments, the storages 145A-C may part of a SAN, NAS or storage service. As shown, known media content items 147A, known media content items 147B, and channel/account content 143 are all stored in separate storage. However, it should be understood that the same storage may be used to store some or all of such data.

The known media content items 147A-B may be media content items that have a known classification and/or a known identification. Additionally, one or more digital fingerprints of the known media content items 147A-B may be stored in storages 145A-B. The digital fingerprints may be digital fingerprints of entire known media content items (e.g., known works such as recorded performances that have been registered with the identification service 170 for copyright protection) and/or may be digital fingerprints of segments of such known media content items. Each digital fingerprint may be subdivided into smaller digital fingerprints of segments or sub-segments of a known media content item (e.g., into digital fingerprints of multiple overlapping segments of the known media content item) for comparison to digital fingerprints of segments of unknown media content items (e.g., fingerprints of segments of UGC).

Licensing information about the known media content items 147A-B may also be stored. Metadata associated with the known media content items 147A-B may also be stored.

The communication logic 164 may send and receive data associated with media content items to be analyzed or that have been analyzed. The data may be received from a remote computing device (e.g., a media content sharing platform 175A-B and/or identification client 190A, 190B running on a remote computing device 101A-B).

Data sent by the identification client 190A-B and received by the identification service 170 may be or include a transaction request for identifying an unidentified media content item and an entire media content item (e.g., an entire file), one or more segments of a media content item, a set of features of a media content item (e.g., one or more digital fingerprint of the media content item), a set of features of a segment of a media content item (e.g., one or more digital fingerprint of a segment of the media content item), lyrical contents of a media content item, a classification of the media content item (e.g., as containing music, as not containing music, or as containing a low quantity, medium quantity or large quantity of music), and/or metadata associated with the media content item. In some embodiments, received data is stored in one or more of storages 145A-E.

In one embodiment, media classifier 152 classifies an unknown media content item as containing music or as not containing music. In one embodiment, media classifier 152 determines whether an unknown media content item contains foreground music, background music, or no music. Additionally, media classifier 152 may determine different classifications for different portions of an unidentified media content item. For example, media classifier 152 may identify minutes 0-15 of an unidentified media content item as containing music and may further identify minutes 16-90 of the unidentified media content item as not containing music. Media classifier 152 may also determine an amount of music contained in a media content item. For example, the media classifier 152 may identify a media content item as containing no music, a small amount of music, a medium amount of music, or a large amount of music. A media content item may be classified as containing a small amount of music if a first threshold percentage (e.g., up to 20%) of the media content item contain music. A media content item may be classified as containing a medium amount of music if more than the first threshold percentage of the media content item and less than a higher second threshold percentage (e.g. up to 40%) of the media content item contains music. A media content item may be classified as containing a large amount of music if greater than the second threshold percentage of the media content item contains music.

Media classifier 152 may be further configured to determine additional classifications for unidentified media content items (or portions or segments thereof) that contain music. For example, media classifier 152 may classify unidentified media content items based on music genre (e.g., rock, punk, heavy metal, pop, R&B, and so on).

Additionally, or alternatively, media classifier 152 may determine a portion and/or amount of the of the unknown media content item that contains audio and a portion and/or amount of the unknown media content item that does not include audio (e.g., for which there is silence on the audio track). Those portions that contain audio may then be further analyzed to determine whether the audio includes music. Alternatively, those portions that contain audio may be tested under the assumption that they contain music without separately analyzing them to determine if they do contain music.

In one embodiment, media classifier 152 includes a lyric/speech to text extraction unit that processes an audio portion of the media content item and generates a text transcription of any sung or spoken words in the audio. The transcription of the lyrical content may then be compared to lyrics of known media content items to identify any matches. In one embodiment, the techniques discussed for lyric identification as discussed in U.S. application Ser. No. 16/875,927, filed May 15, 2020, are applied. The contents of U.S. application Ser. No. 16/875,927 are incorporated by reference herein in their entirety. The lyrical content may be used to identify the audio as containing music or not containing music. This information may be used to determine what type of further analysis to perform. For example, media classifier 152 may determine whether to perform an additional music/no-music classification on one or more portions of the media content item using a trained machine learning model, whether to perform standard content identification of one or more portions of the media content item, and/or whether to perform cover detection of one or more portions of the media content item. How to perform cover identification of the media content item is described in U.S. application Ser. No. 16/875,927.

In addition to performing classification of audio components of media content items, media classifier 152 may additionally or alternatively perform classification of video components of media content items. In one embodiment, media classifier 152 classifies an unknown media content item as containing static video or as containing dynamic video. For example, media classifier may determine whether a video component of the media content item is dynamic (e.g., contains moving objects) or is static (e.g., does not contain moving objects). Additionally, media classifier 152 may determine different classifications for different portions of an unidentified media content item. For example, media classifier 152 may identify minutes 0-15 of an unidentified media content item as containing static video and may further identify minutes 16-90 of the unidentified media content item as containing dynamic video. Media classifier 152 may also determine an amount of static video vs. dynamic video that is contained in the media content item. For example, the media classifier 152 may identify a media content item as containing no static video, a majority dynamic video, a majority static video, or no dynamic video. If a media content item contains no dynamic video or mostly static video, then the audio component of the media content item may be more important, and the audio component of the media content item may be analyzed more closely (e.g., with a greater testing frequency) and the video component of the media content item may be analyzed less closely (e.g., with a reduced testing frequency).

In another embodiment, media classifier 152 may analyze the video component of a media content item to classify the media content item (or one or more segments of the media content item) as containing a talking head (e.g., a talking person) or as not containing a talking head. Long segments of video that contain a talking head may have a decreased likelihood of containing a copy of a movie and/or may have an increased likelihood of containing a copy of a news broadcast, for example.

In one embodiment, media classifier 152 includes one or more trained machine learning models or profiles (e.g., trained convolutional neural networks) that have been trained to classify input media content items. In some embodiments the one or more trained machine learning models are trained to receive an audio file, embedding of an audio file, portion of an audio file, or embedding of a portion of an audio file as an input. Examples of machine learning models that may be used include neural networks (e.g., deep neural networks, convolutional neural networks), support vector machines, decision trees (e.g., random forests), and so on.

In some embodiments, the trained machine learning models are trained to receive one or more embeddings generated from an audio portion of a media content item (e.g., of an audio file). In machine learning, an embedding refers to a projection of an input into another more convenient representation space. For example, a digital fingerprint and/or set of features of a media content item or of a portion of a media content item may be an embedding. The trained machine learning model may output, for each class that it has been trained to identify, a probability that the media content item (or portion of the media content item) belongs to that class. For example, a trained machine learning model may output a first probability that the media content item contains music and a second probability that the media content item does not contain music. If a probability of a class exceeds a threshold, the media content item may be assigned to that class. In another example, for a media content item identified as containing music, it may be processed by a further media content item to determine the genre of music represented in the media content item.

In one embodiment, identification service 170 does not perform further processing of media content items (or portions thereof) that do not contain music or contains very little music. If a media content item fails to contain music, then the identification service 170 may respond to the identification client 190A-B with a response to the transaction request indicating that there is no music contained in the unidentified media content item and/or that the unidentified media content item fails to include any copyrighted music.

In one embodiment, a media content item is divided into multiple sequential segments, and the multiple sequential segments are processed in turn by the trained machine learning model(s). For each such segment, a determination may be made as to whether that segment contains music. A ratio of the lengths of the segments that contain music to the entire length of the media content item may then be determined. This ratio may represent the percentage of the media content item that contains music. The percentage of the media content item that contains music may be compared to one or more thresholds to classify the media content item as containing a small amount of music, a medium amount of music, or a large amount of music. This information may be used to determine a testing recipe for analyzing a media content item to identify copyrighted material contained therein. Additionally, or alternatively, a map of where in the media content item music was found can also be generated, which may be used to determine or generate a testing recipe for analyzing the media content item.

Media identifier 160 is configured to determine matches or near matches between unidentified media content items (or segments or portions thereof) and known media content items (or segments or portions thereof) based on comparisons of digital fingerprints. When such a match or near match is made between an unidentified media content item and a known media content item, then it can be concluded that a segment of unidentified media content item contains an instance of the known media content item. When a match or near match is made between a) a portion of the unidentified media content item and all or a portion of a known media content item or b) an unidentified media content item and a portion of a known media content item, then it can be determined that the unidentified media content item contains at least a portion of the known media content item. In both instances, there may be licensing and/or take-down rules to implement.

Media identifier 160 may determine (e.g., select or generate) a testing recipe to apply for testing of a media content item based on information about the media content item. Such information may include a length of the media content item, a channel or user account associated with the media content item, a media sharing platform hosting the media content item, a map identifying where in the media content item music has been found, an indication of an amount of music in the media content item, and/or other information. The testing recipe may include many different testing parameters, such as an initial testing interval, an interval adjustment factor, interval adjustment rule(s), a degree of similarity, an indication of particular segments to be tested, a rewind criteria, a rewind value, a database identifier, a retesting criterion (or criteria), a segment size, a match length requirement, and so on.

Media identifier 160 may then analyze the media content item to identify any instances of known media content items (e.g., copyrighted music) contained therein according to the determined testing recipe. Analyzing the media content item includes determining matches between the unidentified media content item (or portions thereof) and known media content items.

In one embodiment, media identifier 160 determines matches between unidentified media content items (or portions thereof) that contain music and known media content items.

In one embodiment, the operations of media classifier 152 are skipped, and media identifier 160 may perform identification of an unidentified media content item responsive to any transaction requests from identification clients 190A-B or media content sharing platforms 175A, 175B without a classification having been performed on the unidentified media content item associated with the transaction request.

The media identifier 160 may be configured to determine whether a received media content item includes a copy of at least a portion of a known media content item. The transaction request may have included a digital fingerprint of the unidentified media content item (or multiple digital fingerprints, each of a different segment of the unidentified media content item). Alternatively, the transaction request may have included a copy of the unidentified media content item without any digital fingerprints. If a digital fingerprint (or multiple digital fingerprints) was not included, then media identifier 160 may generate such a digital fingerprint (or multiple digital fingerprints) from the received unidentified media content item.

The digital fingerprint (or multiple digital fingerprints) of the unknown media content item may be compared against the digital fingerprints of all known works registered with identification service 170, or against a subset of all known works (e.g., with popular works). Digital fingerprints generated for a registered work are stored (optionally along with content metadata) in a repository such as a database. For example, digital fingerprints of known media content items 147A-B may be stored along with or in the place of the actual known media content items 147A-B.

Media identifier 160 compares the first digital fingerprints of the one or more segments of the unknown media content item to stored digital fingerprints of the known media content items 147A-B according to a testing recipe. Digital fingerprints can be compared and used to identify media content items even in cases of content modification, alteration, or obfuscation (e.g., compression, aspect ratio changes, resampling, change in color, dimensions, format, bitrates, equalization) or content degradation (e.g., distortion due to conversion, loss in quality, blurring, cropping, addition of background noise, etc.) in embodiments.

In one embodiment, the unidentified media content item is divided into a plurality of segments, and a respective digital fingerprint is generated for each segment. Alternatively, a single larger digital fingerprint may be generated of the media content item, which may be subdivided into smaller digital fingerprints of individual segments. This process may have been performed by identification client 190A-B. The segments may be overlapping or non-overlapping segments. The media identifier 160 compares some subset of the digital fingerprints to a plurality of stored digital fingerprints, wherein each of the plurality of stored digital fingerprints is associated with a respective known media content item of the known media content items 147A-B. The subset of the digital fingerprints to compare to digital fingerprints of known works may be selected based on the testing recipe. The media identifier 160 determines, based on the comparing, whether one or more digital fingerprints of the unknown media content item match digital fingerprints of a known media content item 147A-B. In one embodiment, if a threshold amount or contiguous length of the digital fingerprints of one or more segments of the unidentified media content item match digital fingerprints of a known media content item, then a match can be determined for that contiguous length.

In embodiments, the media identifier 160 dynamically determines which segments of an unidentified media content item to analyze to determine whether those segments match any segments of known media content items. Such a determination may be made according to a testing recipe in embodiments. The media identifier 160 may begin such analysis using an initial interval, frequency and/or match criteria for testing segments, which may be specified in a testing recipe. The initial interval may be, for example, a 30 second interval. In an example, the media identifier 160 may initially test for a match of a 10 second segment for every 30 seconds of an unidentified media content item. The media identifier 160 may determine a number of matches between the initially tested segments of the unknown media content item to segments of known media content items, and may adjust the interval, frequency, match criteria and/or other testing parameters based on the number of matches. The degree of adjustment and the decision on when to make an adjustment may be parameters of a testing recipe. For example, if no matches were identified for the first or first few tested segments, then the interval may be increased (i.e., the frequency of testing segments may be decreased). However, if one or more matches were identified for the first or first few tested segments, then the interval may be decreased (i.e., the frequency of testing segments may be increased). In one embodiment, for every instance of a match between a segment of an unidentified media content item and a segment of a known media content item that is identified, the interval is decreased, and for every instance of a segment of the unknown media content item that fails to match a segment of a known media content item, the interval is increased. The media identifier 160 may additionally reanalyze a media content item or portions thereof (e.g., recheck one or more segments 30 seconds or a minute prior to a last tested segment of an unknown media content item) responsive to identifying one or more matches. When to perform such reanalysis may be specified in a testing recipe. The reanalysis may be performed using a new testing recipe, which may include an increased testing frequency and/or a shorter match requirement (e.g., with a shorter match length requirement), for example. Additionally, or alternatively, the new testing recipe may use a higher resolution fingerprint, which may be able to find more detailed match information or detect matches in the presence of noise, for example. For implementing such a new testing recipe, a new digital fingerprint (or multiple digital fingerprints) of the unidentified media content item may be generated for use in the reanalysis. Different types of digital fingerprints may be generated and used for comparison, depending on the testing recipe. Some digital fingerprints (e.g., high resolution fingerprints) may take longer to generate and/or more time/resources to compare to digital fingerprints of known media content items than others (e.g., lower or medium resolution digital fingerprints), but may provide a higher accuracy, have a lower noise sensitivity, and so on. The data stores containing records of known media content items may include multiple different types of digital fingerprints for the same media content items. Generally, the type of digital fingerprints of the known media content items to which the digital fingerprints of the unknown media content item are compared match the type of digital fingerprints generated of the unknown media content item (e.g., high resolution digital fingerprint compared to other high resolution digital fingerprints).

In some embodiments, identification client 190A, 190B or media content sharing platform 175A, 175B initially sends over one or more first transaction requests to analyze one or more first segments of an unknown media content item (e.g., UGC) to identification service 170 according to an initial testing interval. These requests may contain information sufficient to analyze just the indicated segment(s) of the unknown media content item. Media identifier 160 may send back an indication of a new testing interval to apply for further analysis of the unknown media content item, and may optionally send back the results of testing of the first segment(s). The identification client 190A, 190B or media content sharing platform 175A, 175B may then send a new transaction request to analyze one or more additional segments according to the new testing interval, and may optionally send back results of testing the additional segment(s). This process may continue until media identifier 160 determines that no additional segments of the unknown media content item are to be tested. A full report of the analysis of the unknown media content item may then be sent back to the media content sharing platform 175A, 157B.

Alternatively, identification service 170 may receive a single request to analyze an unknown media content item. Responsive to the request, identification service may determine testing parameters (e.g., testing interval), determine segments to test, and perform analysis on such segments to determine whether those segments match segments of any known media content items. Identification service 170 may dynamically adjust one or more testing parameters during the testing in embodiments based on test results of already analyzed segments. Identification service 170 may then send a result of the analysis back to the identification client 190A, 190B and/or media content sharing platform 175A, 175B.

The identification service 170 may determine one or more actions to take with regards to a media content item (i.e., UGC) based on whether or not portions of that media content item match portions of known media content items (e.g., whether or not that media content item contains portions of copyrighted material), the identity or identities of the known media content items contained in the analyzed media content item and/or the amount of the known media content items contained in the analyzed media content item. For example, the media content item may be tagged as being or containing a specific known work (or multiple known works if there were matches of different segments of the analyzed media content item to different known works). Additionally, advertising may be applied to the media content item and licensing revenues may be attributed to the owner(s) of the rights to the known work(s) (e.g., by licensing logic 162) or the media content item may be removed from the media content sharing platform 175A-B.

If less than a threshold amount of the digital fingerprints of the unidentified media content item match digital fingerprints of any known media content item, then media identifier 160 may fail to identify any portion of the unidentified media content item. That is to say, the unidentified media content item does not include a copy of any portion of any known media content item (e.g., of any known song in a music database).

In some embodiments, identification clients 190A-B may include a media classifier 152, a media identifier 160 and/or one or more other components of the identification service 170. These components may perform the same operations as described with reference to the like-named components of the identification service 170, but may perform such operations locally at the computing device 101A-B of the media content sharing platform 175A-B. In such embodiments, these operations may be performed at a site of the media content sharing platform 175A-B so as to minimize network bandwidth utilization. Media content sharing platform 175A-B may provide an unidentified media content item (or segment of the unidentified media content item, or extracted features of the unidentified media content item) to the identification client 190A-B for media content item identification prior to identification client 190A-B sending the unidentified media content item (or segment of the unidentified media content item, extracted features of the unidentified media content item or digital fingerprints of the unidentified media content item) across the network 131 to server computing device 150. Identification client 190A-B may identify the unidentified media content item as described above.

In some embodiments, media classification is performed by media classifier 152 running on identification client 190A-B, and further processing is only performed if the unidentified media content item contains music. In some embodiments, further processing is only performed for portions or segments of the unidentified media content item identified as containing music. Such further processing may include operations performed by the identification client 190A-B (e.g., generating digital fingerprints, determining lyrical content, etc.) and/or operations performed by identification service 170. In some embodiments, only those portions of the unknown media content item (e.g., UGC) that contain music are further analyzed to determine whether they contain copies of segments of known media content items.

In some embodiments, client computing device 101B includes or has access to a smaller library or repository of known media content items 142 (e.g., which may be stored in storage 140) as compared to the library or repository of known media content items 147A-147B. For example, known media content items 142 may be currently popular music. The known media content items 142 may include first and/or second digital fingerprints (e.g., for direct match determination and/or cover determination) of the known media content items 142. Identification client may invoke media identifier 160 to determine whether an unidentified media content item is or contains a copy of at least a portion of a popular known media content item of known media content items 142. If the media identifier 160 identifies a threshold number of segments or length or percentage of the unknown media content item that matches segments of known media content items 142, then identification client 190B may send one or more transaction requests to identification service 170 to have the unknown media content item (e.g., UGC) analyzed using the larger store of known media content items available to identification service 170.

Licensing logic 162 may determine a licensing rate that a media content sharing platform 178A-B is to pay for user generated content that is a cover of a particular known media content item. In one embodiment, licensing logic 162 determines a licensing rate to apply to a cover media content item based on licensing and royalty rates that may be applied to the cover media content item, which may be dependent on whether the same lyrics are used, on whether the same music is used, and so on.

Licensing logic 162 may be invoked to determine a publishing rights holder, performance rights holder and/or other rights holder of the known media content item(s) contained within UGC. Such rights holder information may be stored along with the known media content items 147A-147B within storage 145A-145B or may be stored in another storage location. The licensing logic 162 may query the storage 145A-145B for the rights holder information. Alternatively, the licensing logic 162 may query other storages or other sources, including external sources to determine the rights holder information.

Upon determining the rights holder information of the known media content item(s) contained in UGC, a resource allocation may be calculated for the identified media content item. In an embodiment, the licensing logic 162 may calculate resource allocation based upon rights holder information which may include licensing and/or royalty fees for media content items. In an embodiment, if the media content item contains data (e.g., music) from two or more known media content items, then licensing logic 162 may calculate a percentage based allocation between the rights holders of the two or more known media content items. The percentage based allocation may be based upon the percentage of the identified cover-media content item that matches each of the two or more known media content items.

Responsive to completing analysis/identification of an unknown media content item for which a request for identification was received from a media content sharing platform 175A-B, identification service 170 and/or identification client 190A-B may send an identification/analysis result back to the media content sharing platform 175A-B. The identification/analysis result may indicate which, if any, known media content items (e.g., copyrighted performances) are contained within the tested media content item, the portion or percentage of the media content item that contains such known media content items, identification of rights holders, and/or other information. Upon determining that the unidentified media content item contains one or more known media content items, the licensing logic 162 may be invoked to determine a licensing rate to apply to the media content item (e.g., UGC). Such a licensing rate may also be reported back to the media content sharing platform 175A-B. In some instances, licensing logic 162 may determine that one or more of the known media content items whose contents are included in the UGC have takedown rules, the report may include an instruction to remove the UGC from the media content sharing platform 175A-B or to remove portions of the UGC from the media content sharing platform 175A-B.

Each initially unidentified media content item (e.g., UGC) that is analyzed by identification service 170 may be associated with a particular media content sharing platform 175A, 175B, and with a unique user account and/or channel on that media content sharing platform. With each analysis of UGC associated with a particular user account and/or channel, results of that analysis may be stored as channel/account content 143 in storage 145C. Such stored analysis results may serve as historical data that can be used to determine an initial testing interval or frequency for analyzing new UGC associated with that channel or user account. For example, identification service 170 may perform statistical analysis of the testing results for past UGC associated with a particular channel or user account, and such statistical analysis may identify locations in media content items to test, an initial testing interval to use, an initial length of match requirement to use, and so on. In some embodiments, the past results of UGC analyses for UGC of a user account or channel is input into a machine learning model trained to determine testing parameters for testing future UGC associated with that user account or channel, and the machine learning model outputs a testing recipe that indicates the testing parameters to use. Examples of such testing parameters include particular portions or segments of UGC to test (e.g., very beginning of UGC, very end of UGC, middle of UGC, etc.), a testing interval or frequency, a match length requirement, and so on. Examples of machine learning models that may be used include neural networks (e.g., deep neural networks, convolutional neural networks), support vector machines, decision trees (e.g., random forests), and so on.

Media content items are classified in embodiments using machine learning profiles and/or machine learning models (i.e., profiles and models produced using machine learning techniques). Server computing device 150 may receive a collection of labeled media content items, which may be used to train a machine learning profile and/or model using supervised training. The media content items may be provided as an input to a machine learning profiler (not shown) as part of a training data set to generate the profiles and/or models. The machine learning profiler may perform supervised machine learning to identify a set of features that are indicative of a first classification and another set of features that are indicative of another classification. The first set of features indicative of the first classification (e.g., indicative of music) may be defined in a first model and a second set of features indicative of the second classification (e.g., lack of music) may be defined in a second model. Alternatively, profiles may be generated for more than two classifications (e.g., small amount of music, medium amount of music, and large amount of music).

Machine learning profiler may generate machine learning profiles for identifying one or more classes of segments of media content items. For example, the machine learning profiler may generate a profile for identifying, for segments of media content items having audio, whether the audio comprises music or does not comprise music. Similarly, the machine learning profiler may generate a profile for identifying, for audio, a classification wherein the audio comprises a particular categorization of music (e.g., a genre including rock, classical, pop, etc.; characteristics including instrumental, a cappella, etc., and so on). A machine learning profile generated by machine learning profiler may be provided to media classifier 152.

Similarly, a training dataset including analyzed media content items from one or multiple channels and/or user accounts may be generated. Each data item in the training dataset may include a particular media content item and an indication of where copyrighted material was identified in the media content item and/or an optimal recipe for testing that media content item. The machine learning model may be trained using the training dataset to determine an optimal testing recipe for testing UGC to determine if that UGC contains copyrighted material. Examples of machine learning models that may be used include neural networks (e.g., deep neural networks, convolutional neural networks), support vector machines, decision trees (e.g., random forests), and so on.

In one embodiment, the machine learning model is trained to identify the best locations in input media content items to search for copyrighted music based on characteristics of the media content item (e.g., of the UGC, which may be a file). Such characteristics may include the length of the media content item, what copyrighted music has already been identified in the media content item and/or where in the media content item such copyrighted music was identified, a user account or channel associated with the media content item and/or other metadata information associated with the media content item. To train such a machine learning model, each training data item in a training dataset may include a feature vector that comprises features of the audio of the media content item as well as additional information such as the characteristics of the media content item indicated above.

During analysis of an unknown media content item, a feature vector (i.e., embedding) may be generated of the unknown media content item. The feature vector may include the features of the audio of the media content item as well as additional characteristics of the media content item. The trained machine learning model may then output an indication of one or more segments of the media content item to be tested. As segments of the media content item are analyzed, the results of such analysis may be used to generate an updated feature vector, which may be input back into the machine learning model. The machine learning model may then output updated information identifying further segments of the media content item to test.

Figure 2:
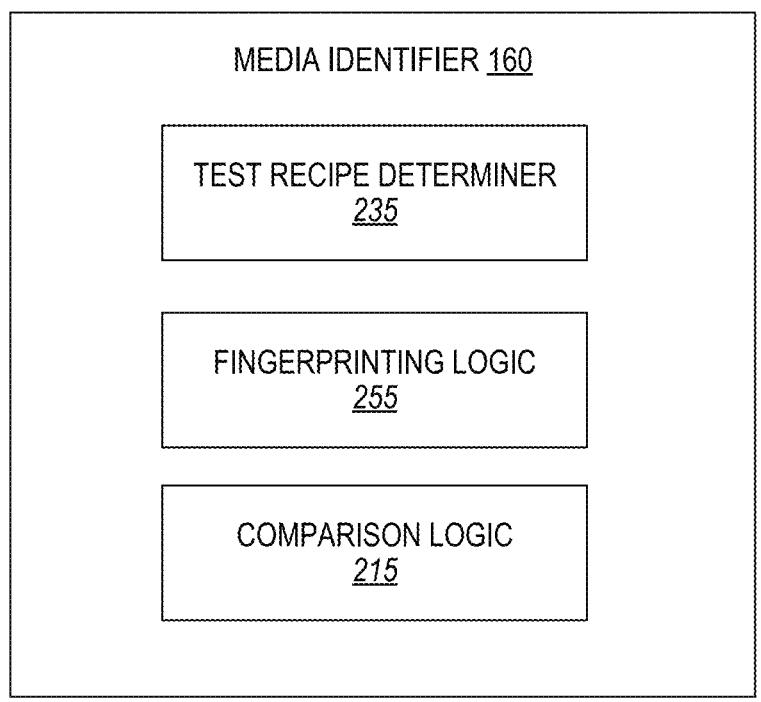
FIG. 2 is a block diagram illustrating a media identifier, according to an embodiment.

FIG. 2 is a block diagram of an example media identifier 160 in accordance with some implementations of the disclosure. In general, the media identifier 160 may correspond to the media identifier 160 of server computing device 150 as shown in FIG. 1. In an embodiment, the media identifier 160 includes a test recipe determiner 235, a fingerprinting logic 255 and a comparison logic 215. Alternatively, one or more of the logics and/or modules of the media identifier 160 may be distinct modules or logics that are not components of media identifier 160. Additionally, or alternatively, one or more of the modules or logics may be divided into further modules or logics and/or combined into fewer modules and/or logics.

Media identifier 160 may receive a request to perform analysis/identification of an unknown media content item (e.g., UGC). The request may include a copy of the unknown media content item, in which case fingerprinting logic 255 may be invoked to generate one or more digital fingerprint of the unknown media content item.

In an embodiment, test recipe determiner 235 may be invoked to determine a test recipe to use to analyze the unknown media content item. The test recipe may include one or more parameters and/or criteria to use for comparing the digital fingerprint(s) of the unknown media content item to digital fingerprints of known media content items.

One parameter that may be specified in the test recipe is one or a set of specified segments to initially test. These may include one or more segments at or near a beginning of the media content item, one or more segments at or near a middle of the media content item, one or more segments at or near an end of the media content item, and/or one or more segments at other locations in the media content item. The testing recipe may further specify an order of testing of the indicated segments. For example, the testing recipe may specify to test a segment at the beginning, a segment at the middle, and a segment at the end of the media content item. In another example, the testing recipe may specify to first test a segment at a particular offset (e.g., timestamp) into the media content item, and to then test another segment at a second particular offset (e.g., timestamp) into the media content item, which may be before or after the first particular offset. Analysis has shown that there are particular locations in certain classes of media content items that are more likely to contain music than other locations. Accordingly, this information may be used to set the initial segments to test.

The test recipe may include one or more rules for determining other testing parameters to select based on the analysis results of the initially tested segments. Such additional parameters, which are set forth in further detail below, may include further segments to test, a testing interval, match length requirements, segment length, and/or other testing parameters.

One criterion that may be specified in the test recipe is a match length requirement, which may specify a minimum contiguous length of a match required for a match to be recognized. For example, a match length requirement may specify that a match must be at least 5 seconds long, or 10 seconds long, or 15 seconds long, or some other length.

One testing parameter that may be specified in the test recipe is an initial test interval. Examples of initial test intervals include 10 seconds, 15 seconds, 20 seconds, 30 seconds, 1 minute, 1.5 minutes, 2 minutes, 5 minutes, and so on.

Another testing parameter that may be specified in the test recipe is an interval adjustment factor, which specifies how aggressively to change the testing interval based on hits or misses between segments of the unidentified media content item and segments of known media content items. The interval adjustment factor may be specified in terms of a percentage of a current or initial test interval or in terms of specified lengths, or in some other manner. For example, the interval adjustment factor might be 10%, and may specify that the testing interval should be increased by 10% for each miss (a failure of a segment of the unidentified media content item to match a segment of any known media content item) and/or that the testing interval should be decreased by 10% for each hit (a match of a segment of the unidentified media content item to a segment of a known media content item). In other examples, the interval adjustment factor may be 5%, 15%, 25%, 30%, 33%, 50%, 100%, or some other amount. In other examples, the interval adjustment factory may be a set length, such as 5 seconds, 10 seconds, 30 seconds, 60 seconds, and so on. For example, the interval adjustment factor may specify that the testing interval should be increased by 30 seconds for each miss and/or that the testing interval should be decreased by 30 seconds for each hit. In some embodiments, different interval adjustment factors may be applied for hits and misses. For example, a first interval adjustment factor may be used to increase the interval by 30 seconds for each miss, and a second interval adjustment factor may be used to decrease the interval by 10 seconds for each hit. In some embodiments, different interval adjustment factors may be applied depending on the current testing interval. For example, if the current interval is less than or equal to 2 minutes, than a first interval adjustment factor may be applied for a hit and/or miss, and if the current testing interval is greater than 2 minutes, then a second interval adjustment factor (which may be larger or smaller than the first interval adjustment factor) may be applied for a hit and/or a miss.

In some embodiments, the interval adjustment factor is based on multiple past match results for an unknown media content item. For example, if multiple misses occur in a row, then a higher interval adjustment factor may be applied than if a single miss was identified. In one embodiment, the interval adjustment factor is based on a moving window of past match results. The moving window may be expressed in terms of time (e.g., a 10 minute long moving window) or in terms of a number of tested segments (e.g., 5 past tested segments). The percentage of hits to misses within the moving window may be used to determine whether to adjust the testing interval as well as to determine an interval adjustment factor to apply. In some embodiments, weights are applied to the past hit/miss results for tested segments, with higher weights being applied to more recently tested segments.

Another testing parameter that may be specified is a degree of similarity that constitutes a match.

Another testing parameter that may be specified is an indication of particular segments of an unknown media content item that are to be tested. For example, a testing parameter may specify that a segment at a beginning of the unknown media content item is to be tested, that a segment in a middle of the unknown media content item is to be tested, and that a segment at an end of the unknown media content item is to be tested.

In one embodiment, media identifier 160 may begin testing of segments at or near a start of an unknown media content item and progress linearly towards testing of segments at or near an end of the unknown media content item. However, in other testing scenarios, media identifier 160 may not test segments that are linearly arranged in time. For example, media identifier 160 may test a segment at an end of a media content item, then test a segment at a beginning of the media content item, and then test a segment near a middle of the media content item.

Two testing parameters that may be specified are a rewind criterion that specifies when to revisit segments for which a decision was previously made not to test those segments, as well as a rewind value that species an amount of time or length to rewind. For example, a rewind criterion may be met if a hit is found for a segment of an unknown media content item and no segments within 2 minutes prior to the segment for which the hit was identified have been tested. A rewind value may specify, for example, that the media identifier 160 should test a previously untested segment that is 1 minute prior to the segment for which a hit was identified.

Another testing parameter that may be included in a testing recipe is a database identifier. The database identified may specify a database (or other data store) of known media items to use for analysis/identification of an unknown media content item.

Another testing parameter that may be included in a testing recipe is a retesting criterion (or criteria). If a retesting criterion is satisfied, then an entire unknown media content item may be retested. The retesting of the media content item may be performed using a different testing recipe than was used for the initial testing. The new recipe to use for the retesting may be specified as a parameter in the initial test recipe.

Another testing parameter that may be included in a testing recipe is a size of segments to compare. For example, segments that are compared may be 5 seconds long, 10 seconds long, 15 seconds long, or some other length. The size of the segments to be compared may be the same as the match length criterion. Alternatively, the size of the segments to be compared may be different from the match length criterion. For example, the match length criterion may be smaller than the size of the segments to be compared (e.g., the match length criterion may be 5 seconds and the segments may be 10 seconds long).

Many unidentified media content items will contain both video and audio data. For such unidentified media content items, information from the video data may be used as queues to determine segments of the audio data that are more or less likely to contain music. Similarly, information from the audio data may be used as queues to determine segments of the video data that are more or less likely to contain copyrighted material. Accordingly, the video data may be used to influence an analysis of the audio data, and vice versa. In an example, the video data may be analyzed to identify scene changes (e.g., using machine learning models or other traditional techniques for identifying scene changes) in the video. Each scene may be treated as an independent portion of the media content item and may be tested using the same or different testing parameters. Alternatively, or additionally, a segment at the beginning of each scene may be selected for analysis.

In some embodiments, media content items containing both audio and video are analyzed to identify correlations between audio and video. Such correlations may be used to determine generalizations about media content items. For example, low activity in the video may imply classical music, while high activity in the video may imply rock music. In embodiments, the audio and video data are both used to train the machine learning model used by the media classifier, and embeddings from media content items input into the trained machine learning model include data from both the audio and the video of the media content items.

In some embodiments, the video portion of a media content item is processed using a trained machine learning model that has been trained to classify or identify contents of frames of the video. For each frame or set of frames of the media content item, the machine learning model may indicate one or more objects contained therein, or may classify the frame as including a particular type or class of content. Such indication of the objects in the frame and/or the type or class of the frame may be used to make educated guesses about the audio content associated with that frame. For example, if a frame includes a person at a podium, then this may be assumed to be a person giving a speech. Accordingly, an audio speech to text processor may be used on the associated audio data to generate a text transcription of the audio. The text transcription may then be compared to a library or repository of texts of speeches, which may be protected by copyright. In another example, if a digital fingerprint of a segment of video content (e.g., a sequence of frames constituting a segment of the media content item) may be classified as a movie or not as a movie by a trained machine learning model. If it has been classified as a movie, then it may be compared to fingerprints of a database of movies to identify any matches. In another example, if an orchestra is identified in a frame, then there is a high probability that the associated audio contains classical music. Thus, the segment of audio associated with the frame may be compared to just classical music from the known media content items. Additionally, or alternatively, the segment of audio associated with the frame of the video may be processed using a trained machine learning model trained to classify audio. The trained machine learning model may determine whether the audio contains music and/or whether the audio contains classical music, for example.

Comparison logic 215 may be invoked to compare digital fingerprints of segments of an unknown media content item to digital fingerprints of known media content items. The unidentified media content item may have been divided into overlapping or non-overlapping segments or frames, and digital fingerprints may have been determined for each such segment or frame. A segment or frame of the unidentified media content item may be analyzed with respect to a set of features including loudness, pitch, beat, timbre, rhythm, brightness, spectral bandwidth, energy in one or more spectral bands, spectral steadiness, Mel-frequency cepstral coefficients (MFCCs), and so on. Fingerprinting logic 255 may have determined values for some or all of these features, which may be included in the digital fingerprint of the segment.

In some implementations, feature vectors (e.g., digital fingerprints) of one or more segments of the media content item are generated remotely (e.g., by a remote computing device executing a media content sharing platform), and such feature vector(s)/digital fingerprint(s) are received from the remote computing device rather than the segments of the media content item. The feature vector(s)/digital fingerprint(s) may be received along with metadata associated with the unknown media content item rather than receiving the media content item. This may reduce network bandwidth utilization.

The set of features (e.g., the feature vector(s) or digital fingerprint(s)) may be provided to the comparison logic 215 to determine whether the set of features/digital fingerprint of the segment of the unidentified media content item is similar to a defined set of features/digital fingerprint for a segment of a known media content item (e.g., a recorded performance). In one implementation, a comparison between a digital fingerprint/feature vector of the unknown media content item and a digital fingerprint/feature vector of a known media content item may be performed by computing self-similarity matrices for each of the feature types for the unidentified media content item and the known content media item that are included in the digital fingerprints. Self-similarity matrices may be used to determine similarities of features within a media content item. In an embodiment, self-similarity matrices may be generated by calculating Euclidean distances between feature vectors within the media content item. Additionally, cross-similarity matrices may be computed for each feature type between the unidentified media content item and the known content media item. Cross-similarity matrices may be used to measure the similarities between the two different media content items. In an embodiment, cross-similarity matrices may be generated by calculating Euclidean distances between possible pairs of feature vectors from each media content item. In other embodiments, cross-similarity matrices may be calculated differently depending on the feature vectors. Generation of cross-similarity matrices and self-similarity matrices are further described herein.

The cross-similarity matrices and the set of self-similarity matrices may then be fused using Similarity Network Fusion (SNF) techniques. SNF is a computational method for data integration by constructing a sample similarity network for each of the data types and then iteratively integrating the networks using network fusion. The resulting matrices may then be transformed into a binary cross-recurrence plot, which is a plot showing, at a given moment of time, the instances an occurrence of where a feature occurs. In one implementation, the binary cross-recurrence plot may then be scored using a Smith-Waterman algorithm to determine a similarity score between the unidentified media content item and the known media content item. In other implementations, the comparison logic 215 may implement other matching algorithms to determine the similarity between the features/digital fingerprints of the segments of the unidentified media content item and the features/digital fingerprints of the segments of the known media content item.

In one embodiment, for each comparison of the feature vector(s)/digital fingerprint(s) of a segment of an unknown media content item to the feature vector(s)/digital fingerprint(s) of a segment of a known media content item, a feature similarity score (also referred to as a music/audio similarity score) is computed. The feature similarity score may indicate a level of similarity between the audio features of the segment of the unknown media content item and the audio features of the segment of the known media content item, referred to herein as music similarity and/or audio similarity. An audio similarity score/music similarity score may be generated for each comparison of the digital fingerprint(s) of the unidentified media content item to the second digital fingerprint(s) of a known media content item.

FIGS. 3, 5-6 and 8 are flow diagrams illustrating various methods of testing or analyzing unknown media content items (e.g., UGC) to identify known media content items (e.g., copyrighted music) in the unidentified media content items and performing actions based on a result of such identification. The methods may be performed by processing logic that comprises hardware (e.g., circuitry, dedicated logic, programmable logic, microcode, etc.), software (e.g., instructions run on a processor), firmware, or a combination thereof. The methods may be performed, for example by one or more of computing devices 101A-B and/or server computing device 150 of FIG. 1 in embodiments.

Figure 3:
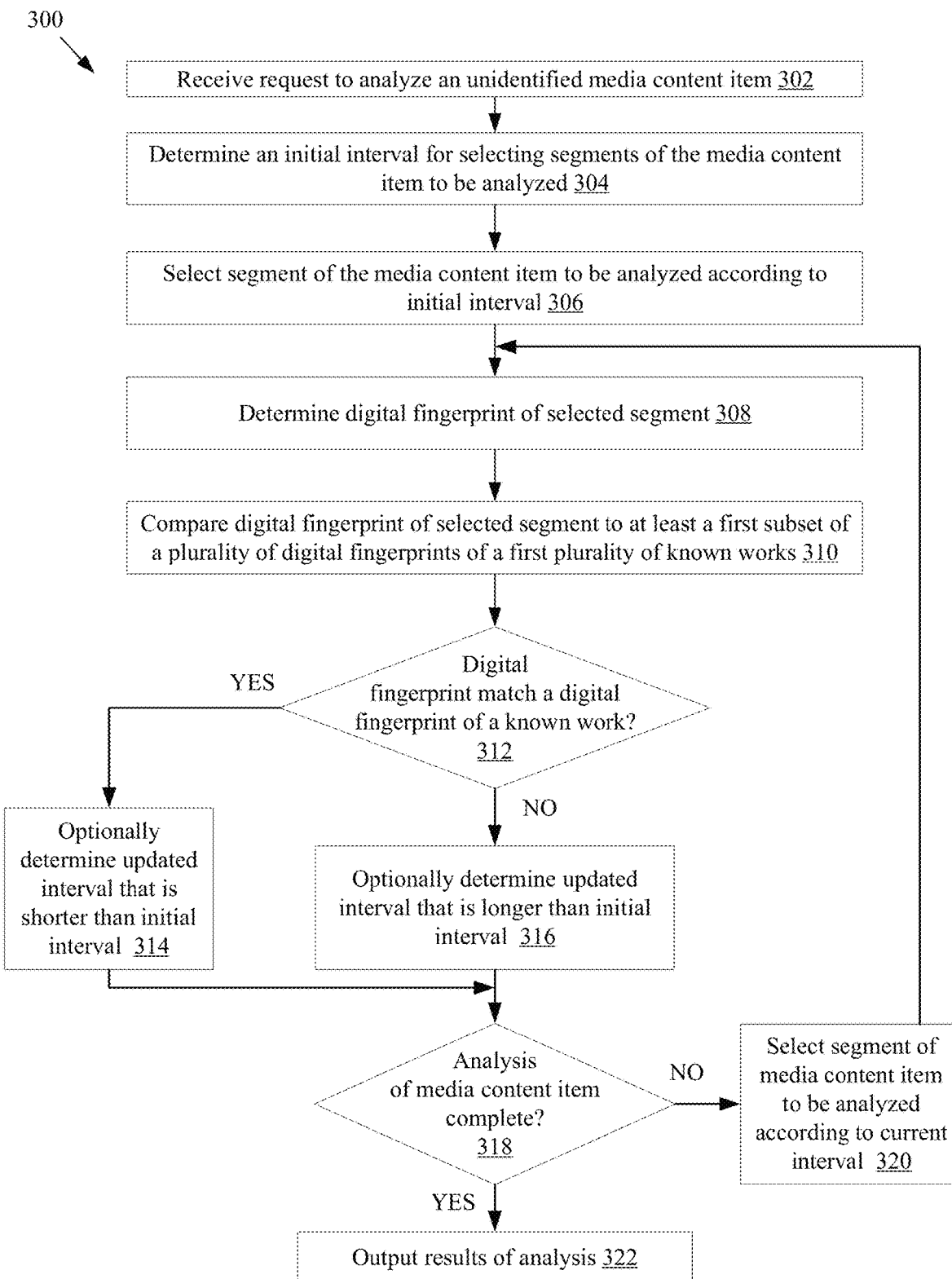
FIG. 3 is a flow diagram illustrating a method for analyzing a media content item for copyrighted material, according to an embodiment.

FIG. 3 is a flow diagram illustrating one embodiment of a method for analyzing/testing an unidentified media content item to identify portions of known media content items contained therein, according to embodiments of the present disclosure. At block 302 of method 300, processing logic receives a request to test/analyze an unidentified media content item. The request may be received from additional processing logic hosted by a same computing device as the processing logic executing the method. Alternatively, the request may be received from a remote computing device. The request may include a copy of the unidentified media content item, a copy of a segment of the media content item, a digital fingerprint of the media content item, and/or a digital fingerprint of a segment of a media content item. In one embodiment, the media content item is a live stream, and the live stream is periodically analyzed. For example, a segment of the live stream may be analyzed every few minutes.

At block 304, processing logic determines a testing recipe for testing the media content item. This may include determining an initial interval for selecting segments of the media content item to be analyzed. At block 306, processing logic selects a segment (or multiple segments) of the media content item to be analyzed according to the initial interval of the testing recipe.

In one embodiment, prior to selecting the segment (or segments), processing logic determines that the unidentified media content item contains audio. Processing logic may then determine features of the audio. For example, features may be extracted from the media content item, which may be those features that optimally determine the likelihood that a media content item belongs to a classification. Such features may include, for example, the loudness envelope of the audio component of the media content item to determine the loudness at each moment in time. Features representative of the brightness of the audio (e.g., bass and treble component of the audio) may also be extracted. A derivative of the loudness envelope may be taken to identify the change in the loudness at each time. An FFT algorithm identifying other characteristics and an MFCC algorithm may be applied to identify the frequency domain characteristics and the clustered features of the media content item. Features may be extracted at an interval (e.g., 1 second interval, 0.5 second interval, 0.10 second interval). In another example, fifty two features may be extracted at multiple time intervals and used to generate a feature vector. Alternatively, more or fewer features may be extracted and used to generate a feature vector.

The set of features may be input into a machine learning model trained to classify media content items. In one embodiment, the machine learning model is trained to classify media content items (or segments thereof) as containing or not containing music. In one embodiment, segments of the media content item (or embeddings extracted from the segments of media content item) are input into the trained machine learning model, and the trained machine learning model indicates which segments of the media content item have a high probability of containing music. In one embodiment, the selected segment that is selected at block 306 is selected from the segments that contain music or are likely to contain music (e.g., where a probability of containing music is over 50%, over 60%, over 70%, over 80% or over 90%).

At block 308, processing logic determines a digital fingerprint for the selected segment (or digital fingerprints for each selected segment). For example, if a digital fingerprint for the entire media content item was previously received or generated, processing logic may determine a segment of the digital fingerprint that corresponds to the selected segment of the media content item. If no digital fingerprint was previously generated, then a digital fingerprint for the selected segment may be generated or a digital fingerprint for the entire media content item may be generated, and a segment of the digital fingerprint may selected which corresponds to the selected segment of the media content item to be tested. The digital fingerprint of the segment may be a portion of a larger digital fingerprint of the entire media content item, and may not be separate from that larger digital fingerprint. Alternatively, the digital fingerprint of the segment may be a distinct digital fingerprint. Accordingly, when the term digital fingerprint of a segment is used herein, such a term covers both the embodiment of a distinct digital fingerprint of just that segment as well as the embodiment of a portion of a digital fingerprint of the media content item, where the portion of the digital fingerprint corresponds to the selected segment of the media content item.

At block 310, processing logic compares the one or more digital fingerprints of the segment(s) of the media content item (which as discussed above may be selected portions of a digital fingerprint of the media content item) to digital fingerprints of a plurality of known works. Alternatively, processing logic may send the digital fingerprint(s) of the segment(s) (or the digital fingerprint of the media content item) to a second processing device for comparison. In an embodiment, processing logic compares the digital fingerprint(s) of each selected segment to a plurality of stored digital fingerprints of one or more known media content items.

At block 312, processing logic (or second processing logic) determines whether any of the digital fingerprints of the selected segment(s) (which may be portions of a digital fingerprint of the media content item) matches one or more digital fingerprints of a known work. If a match is found, then the segment of the media content item is identified as being or containing an instance of at least a portion of the known media content item. Additionally, the method continues to block 314, and processing logic optionally determines an updated testing interval that is shorter than the initial testing interval. At block 314 processing logic may apply one or more rules for adjusting the interval, which may include one or more interval adjustment factors, as previously described. The rules may indicate that the interval is not to be adjusted, or may indicate that the interval is to be reduced. Processing logic may also make other adjustments to testing according to the rules, such as modifying a resolution of digital fingerprints to be used, changing a match length requirement, and so on. The method then continues to block 318.

If at block 312 processing logic (or second processing logic) determines that the digital fingerprint(s) of the selected segment(s) do not match digital fingerprints of any segments of any known media content item, then the processing logic determines that the segment(s) of the unknown media content item are not, or do not include, instances of any known media content item. Additionally, the method proceeds to block 316, at which point processing logic optionally determines an updated interval that is longer than the initial interval. At block 316, processing logic may apply one or more rules for adjusting the interval, which may include one or more interval adjustment factors, as previously described. The rules may indicate that the interval is not to be adjusted, or may indicate that the interval is to be increased. Processing logic may also make other adjustments to testing according to the rules, such as modifying a resolution of digital fingerprints to be used, changing a match length requirement, and so on. The method then continues to block 318.

At block 318, processing logic determines whether analysis of the media content item is complete. If analysis is not complete, then the method continues to block 320. If analysis is complete, then the method proceeds to block 322.

At block 320, processing logic selects a new segment of the media content item to be analyzed according to the current interval. The current interval may be the initial interval if no adjustment was made to the testing interval. Alternatively, the current interval may be an updated interval if an adjustment to the interval was made at block 314 or block 318. The method then returns to block 308 for testing of the newly selected segment.

At block 322, processing logic outputs a result of the analysis. This may include sending a response to a requestor (e.g., a media content sharing platform) from which the initial analysis request was received.

Figure 4A:
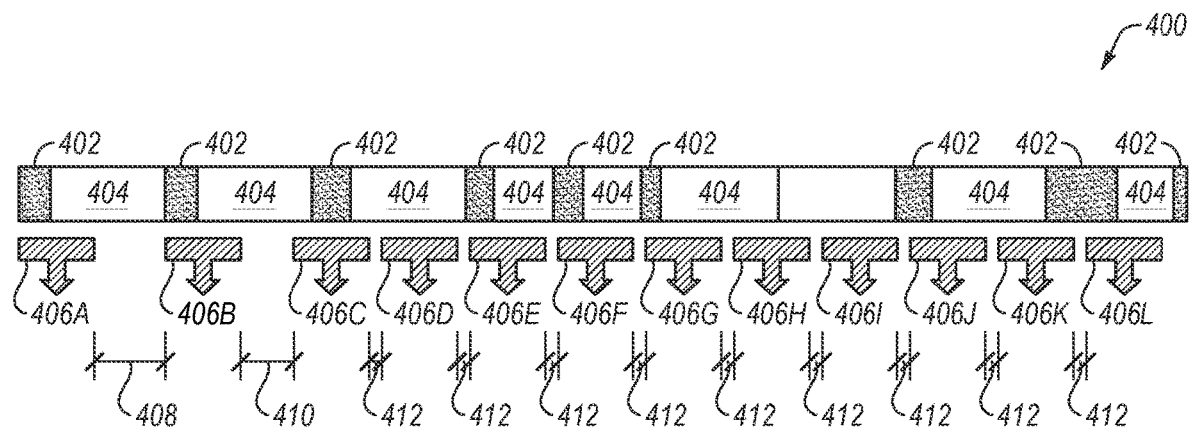
FIGS. 4A-C illustrate example analyses of various unidentified media content items, in accordance with an embodiment.
Figure 4B:
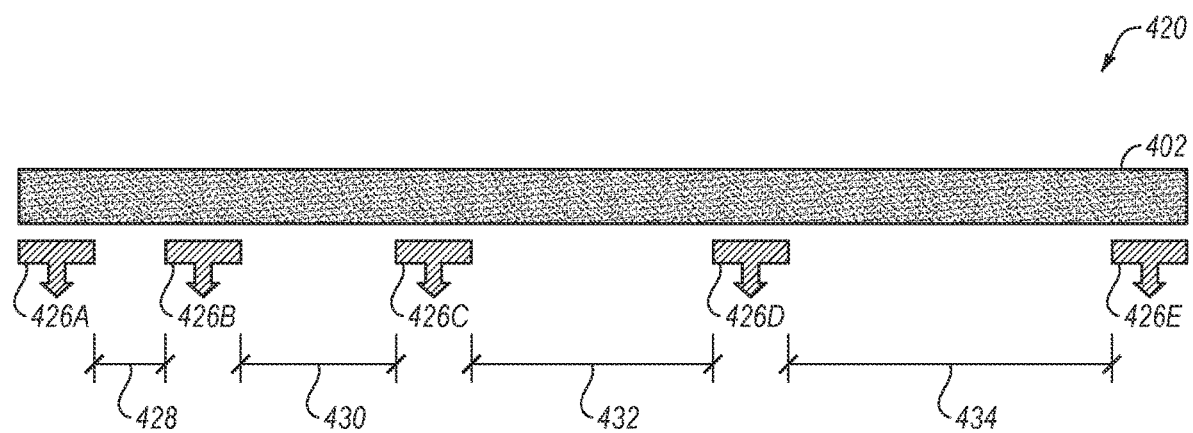
Figure 4C:
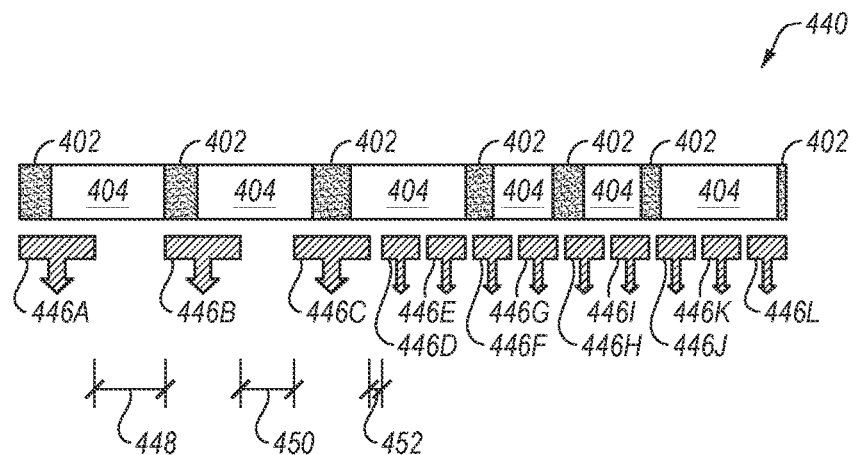

FIGS. 4A-C illustrate example analyses of various unidentified media content items, in accordance with an embodiment. Though FIGS. 4A-C show testing starting from a beginning of the media content item and progressing to an end of the media content item for convenience of illustration, testing may start from any region of the media content item. For example, testing may begin by analyzing first the middle of the media content item, followed by analyzing a segment at a time offset of 25% into the media content item, and followed by analyzing a segment at a time offset of 75% into the media content item. Based on the result of these tests, processing logic may then determine an appropriate updated testing interval and/or other updated testing parameters.

FIG. 4A illustrates an example analysis of a media content item 400 that contains a large amount of copyrighted material. As shown, first portions 402 of the media content item do not include copyrighted material (i.e., known media content items) and second portions 404 of the media content item do contain copyrighted material. As shown, a first two segments 406A, 406B of the media content item were tested according to an initial testing interval 408, and portions of each of those segments were found to contain copyrighted material. Accordingly, after these segments were found to contain copyrighted material, the testing interval was reduced to updated testing interval 410. Segment 406C was again found to contain portions of copyrighted material, and so the testing interval was further reduced to updated testing interval 412. Updated testing interval 412 was determined to be a minimum testing interval, and so no further reduction of the testing interval was made even though each of segments 406D-406L were also found to contain portions of copyrighted material.

FIG. 4B illustrates an example analysis of a media content item 420 that contains no copyrighted material. As shown, all portions 402 of the media content item fail to include copyrighted material (i.e., known media content items). As shown, a first two segments 426A, 426B of the media content item were tested according to an initial testing interval 428, and portions of each of those segments were found to contain no copyrighted material. Accordingly, after these segments were found to contain no copyrighted material, the testing interval was increased to updated testing interval 430. Segment 426C was again found to contain no copyrighted material, and so the testing interval was further increased to updated testing interval 432. Segment 426D was again found to contain no copyrighted material, and so the testing interval was further increased to updated testing interval 434.

FIG. 4C illustrates an example analysis of a media content item 440 that contains significant amounts of copyrighted material. With the examples shown in FIGS. 4A and 4B, the testing interval was adjusted based on whether or not a match was found to a segment of a known media content item, but the match length requirement and size of segments that were tested remained the same. However, in some embodiments the match length requirement and/or size of segments to be tested may be adjusted based on whether or not a match was found to a segment of a known media content item.

As shown in FIG. 4C, first portions 402 of the media content item 440 do not include copyrighted material (i.e., known media content items) and second portions 404 of the media content item do contain copyrighted material. As shown, a first two segments 446A, 446B of the media content item were tested according to an initial testing interval 408, and the size of the segments that were tested had a first size. Portions of each of those segments were found to contain copyrighted material. Accordingly, after these segments were found to contain copyrighted material, the testing interval was reduced to updated testing interval 450. Segment 446C was again found to contain portions of copyrighted material, and so the testing interval was further reduced to updated testing interval 452. Additionally, the size of segments and/or the match length requirement was reduced. Updated testing interval 452 was determined to be a minimum testing interval, and so no further reduction of the testing interval was made even though each of segments 446D-446L were also found to contain portions of copyrighted material. As shown, segments 446D-446L are smaller than segments 446A-446C.

Figure 5:
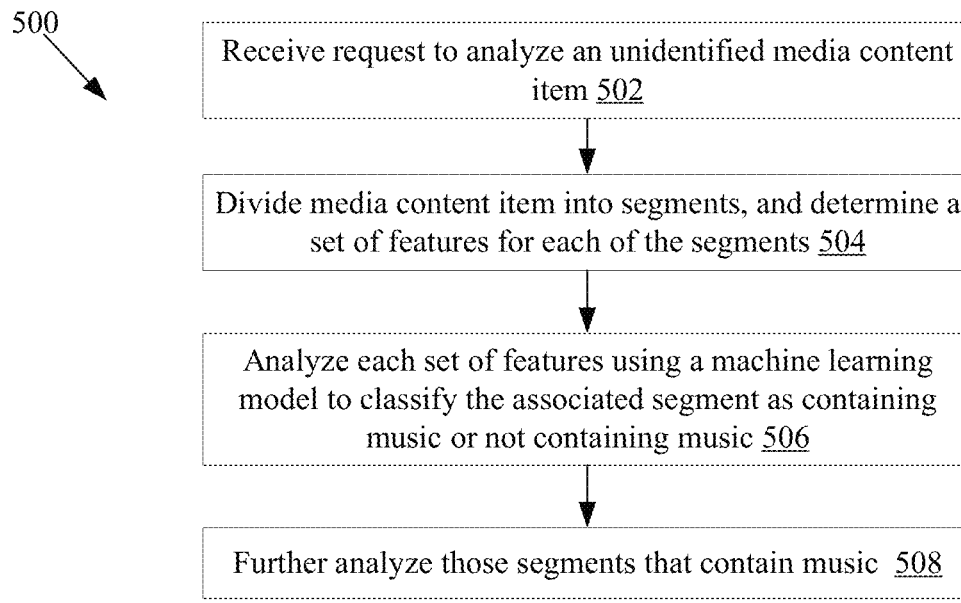
FIG. 5 illustrates a flow diagram illustrating a method for classifying segments of a media content item as containing music or not containing music using a trained machine learning model, in accordance with an embodiment.

FIG. 5 is a flow diagram illustrating one embodiment of a method 500 for analyzing/testing an unidentified media content item to identify portions of known media content items contained therein, according to embodiments of the present disclosure. At block 502 of method 500, processing logic receives a request to test/analyze an unidentified media content item.

At block 504, processing logic divides the media content item into segments, and determines a set of features (referred to as an embedding) for each segment. In one embodiment, the set of features that are extracted are the set of features which optimally determine the likelihood that a media content item belongs to a classification. For example, the features that are extracted from the media content item may include the loudness envelope of the audio component of the media content item to determine the loudness at each moment in time. Features representative of the brightness of the audio (e.g., bass and treble component of the audio) may also be extracted. A derivative of the loudness envelope may be taken to identify the change in the loudness at each time. An FFT algorithm identifying other characteristics and an MFCC algorithm may be applied to identify the frequency domain characteristics and the clustered features of the media content item. Features may be extracted at an interval (e.g., 1 second interval, 0.5 second interval, 0.10 second interval). In another example, fifty two features may be extracted at multiple time intervals and used to generate a feature vector. Alternatively, more or fewer features may be extracted and used to generate a feature vector.

At block 506, processing logic analyzes each set of features associated with a segment using a trained machine learning model to classify the associated segment as containing music or not containing music. The set of features may be input into the machine learning model trained to classify media content items (or segments thereof) as containing or not containing music. In one embodiment, segments of the media content item (or the embeddings extracted from the segments of media content item) are input into the trained machine learning model, and the trained machine learning model provides an output which indicates which segments of the media content item contain music. In one embodiment, the selected segment that is selected at block 306 of method 300 is selected from the segments that contain music based on the initial interval.

In one embodiment, processing logic determines a percentage of the media content item that contains music based on the classification of the segments. This percentage may then be used to select a testing recipe. In one embodiment, the percentage of the media content item that contains music (or ratio of the combined size of the segments containing music to the total size of the media content item) is used to classify the media content item is containing a small, medium or large amount of music. This classification may then be used to select a testing recipe.

In an example, the set of features may be analyzed using machine learning profiles for a first and second class of media content items, where one class is containing music and the other class is not containing music. In one embodiment, a single machine learning profile (also referred to herein as a media classification profile) contains models for multiple different classifications of media content items. Alternatively, a separate machine learning profile may be used for each model. In one embodiment, the machine learning profiles comprise a machine learning model and other associated metadata. The extracted features (i.e., embeddings) of the media content item are supplied to the machine learning model(s) (e.g., as a feature vector) and an output may be generated indicating the likelihood that the media content item matches the classification of the machine learning profile. For example, a media classification profile may identify a first percentage chance that a media content item comprises audio features representative of music and a second percentage change that the media content item comprises audio features representative of a lack of music.

In one embodiment, the percentage chance (or probability or likelihood) that the media content item belongs to a particular classification is compared to a threshold. If the percentage chance that the media content item belongs to a particular class exceeds the threshold (e.g., which may be referred to as a probability threshold), then the media content item may be classified as belonging to the particular class.

In some embodiments, thresholds on particular features may be used instead of or in addition to the probability threshold. For example, specific thresholds may exist for only a first feature, such as the loudness feature, or the threshold may exist for multiple features, such as both the loudness and brightness features. Thresholds and any accompanying combination of thresholds may be stored in the metadata of the associated machine learning profile. If the probability that a media content item belongs to a particular class exceeds or meets a probability threshold of the machine learning profile, then it may be determined that the media content item is a member of that particular class.

If the probability fails to meet or exceed the probability threshold, then it may be determined that the media content item does not belong to the class and/or belongs to another class. In one embodiment, a machine learning profile may have a second machine learning model with its own thresholds to be applied to the media content item to determine if the media content item belongs to the second class.

At block 508, processing logic further analyzes those segments that contain music (or a subset of the segments that contain music). Alternatively, or additionally, processing logic selects a testing recipe based on the information indicating which segments contain music. If none of the segments contain music, then no further analysis may be performed to identify the media content item.

In an example, generally audio media content items are processed to determine whether any portions of the media content item match one of multiple known audio works, referred to as identification. Such processing can utilize a significant amount of processor resources as well as network bandwidth resources. However, usually non-musical audio media content items are not registered for copyright protection. A significant amount of audio media content items on some media content sharing platforms may not contain music (e.g., up to 50% in some instances). Accordingly, resource utilization may be reduced by 50% in such an instance by identifying those segments of media content items that do not contain music and then failing to perform additional processing on such segments of media content items in an attempt to identify those segments of the media content items. A determination that the media content item (or segments thereof) belongs to a second class that will not be further analyzed reduces the bandwidth and/or processor utilization of an identification service and frees up additional processing resources for analyzing media content items that belong to the first class.

In one embodiment, processing logic further analyzes those segments (or subsets thereof) that contain music according to method 300. For example, a testing recipe and/or an initial interval may be determined for selecting subsets of segments for analysis, where segments in the subset are selected from the segments that were determined to contain music.

Figure 6:
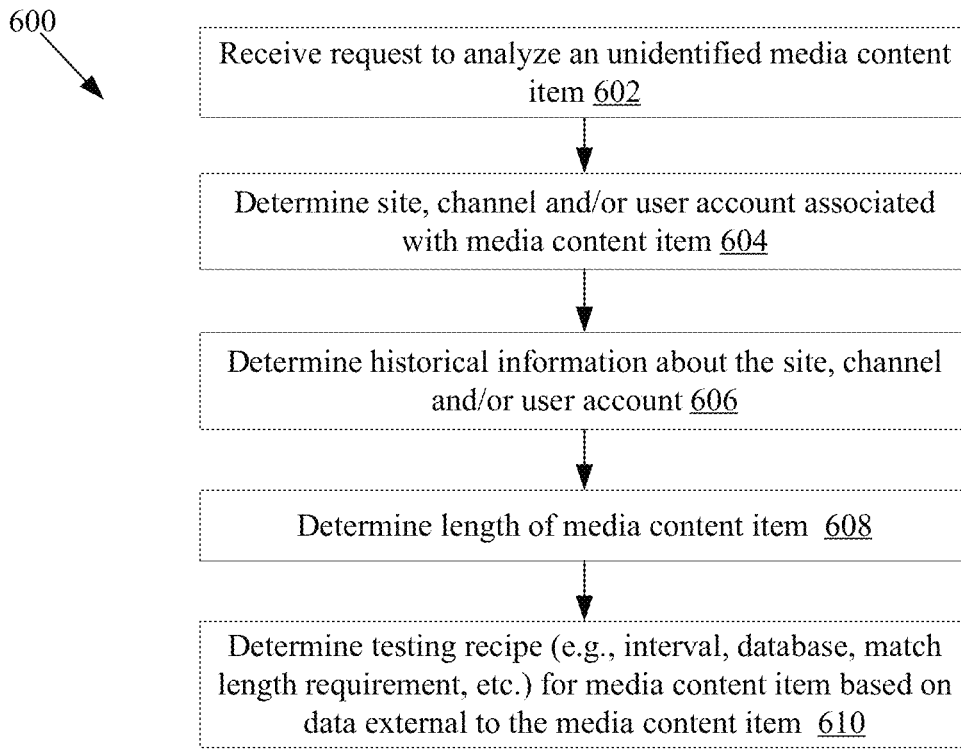
FIG. 6 illustrates a flow diagram illustrating a method for determining a testing interval, database and/or match length requirement to use for analyzing a media content item, in accordance with an embodiment.

FIG. 6 is a flow diagram illustrating one embodiment of a method 600 for analyzing/testing an unidentified media content item to identify portions of known media content items contained therein, according to embodiments of the present disclosure. At block 602 of method 600, processing logic receives a request to test/analyze an unidentified media content item.

At block 604, processing logic determines a site (e.g., a media content sharing site), a channel and/or a user account associated with the media content item. The request may include a unique identifier (ID) that identifies the user account and/or channel. At block 606, processing logic determines historical information about the site, channel and/or user account. The unique identifier may be compared to stored information (e.g., a database of unique IDs) to determine if there is any historical information associated with that user account or channel associated with the unique ID. The historical information may include statistics on the amount of copyrighted material that has previously been found in media content items uploaded to the user account or channel, locations in media content items where copyrighted material has been found, types of copyrighted material that has been found, and so on. At block 608, processing logic may additionally determine a length of the media content item and/or other information (e.g., metadata) about the media content item.

At block 610, processing logic determines a testing recipe for the media content item based on data external to the media content item (e.g., based on metadata associated with the media content item, based on historical information of the user account and/or channel associated with the media content item, etc.). In one embodiment, processing logic determines the testing recipe based on the historical information about the site, channel and/or user account associated with the media content item. In one embodiment, processing logic determines the testing recipe based on a length of the media content item. In one embodiment, processing logic determines the testing recipe based on a classification of the user account or channel associated with the media content item. For example, channels may be classified as music channels, game channels, news channels, etc., and each type of channel may be associated with a different probability of media content items uploaded to that type of channel containing copyrighted material and/or a density of copyrighted material contained therein. The determined testing recipe may include any of the aforementioned testing recipe parameters, such as an initial interval, a database to use for comparison to known media content items, a match length requirement, and so on. Once the testing recipe is determined, it may be implemented, for example using method 300.

Figure 7A:
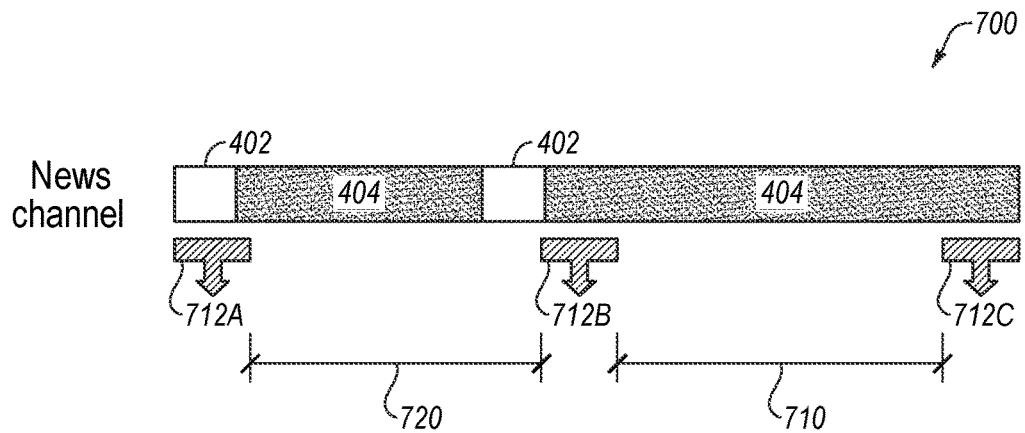
FIGS. 7A-C illustrate example testing recipes for analyzing media content items from various channels, in accordance with an embodiment.
Figure 7B:
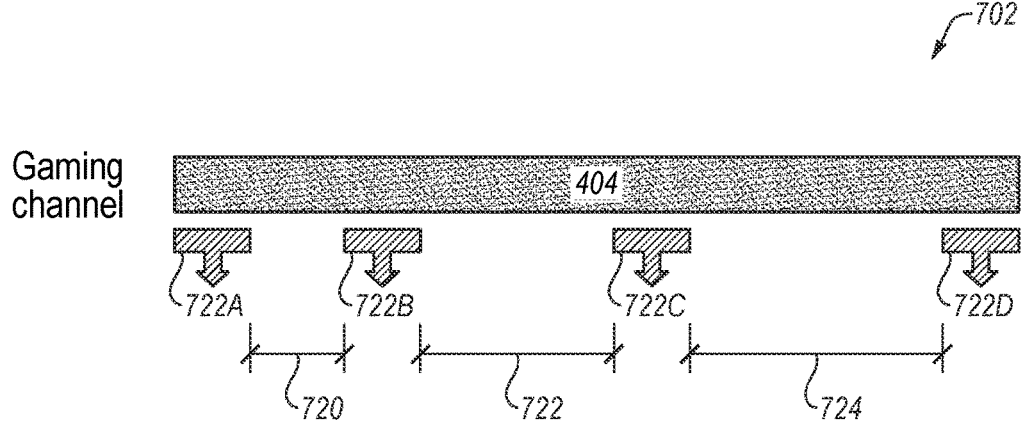
Figure 7C:
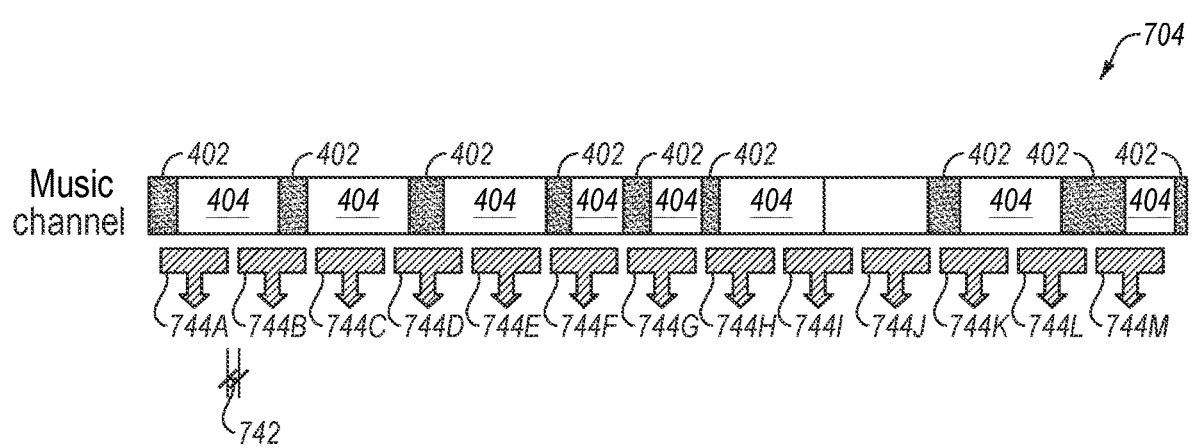

FIGS. 7A-C illustrate application of example testing recipes to analyze media content items from various channels, in accordance with an embodiment.

FIG. 7A illustrates a testing recipe applied to test a media content item 700 from a news channel. The testing recipe may include a first segment size and/or a first match length requirement, may include a first initial testing interval 710, and may include first rules on adjusting the testing interval. Each of the segments 712A-C of the media content item 700 may have the first segment size.

FIG. 7B illustrates a testing recipe applied to test a media content item 702 from a gaming channel. The testing recipe may include a second segment size and/or a second match length requirement, may include a second initial testing interval 720, and may include second rules on adjusting the testing interval. As shown, the second initial testing interval 720 is used, followed by a first updated testing interval 722 and a second updated testing interval 724. Each of the segments 722A-D of the media content item 702 may have the second segment size.

FIG. 7C illustrates a testing recipe applied to test a media content item 704 from a music channel. The testing recipe may include a third segment size and/or a third match length requirement, may include a third initial testing interval 742, and may include third rules on adjusting the testing interval. As shown, the third initial testing interval 742 is used, which is a much shorter testing interval than used for the gaming channel or news channel. Each of the segments 744A-M of the media content item 704 may have the third segment size, which is smaller than the first and second segment sizes.

Figure 8:
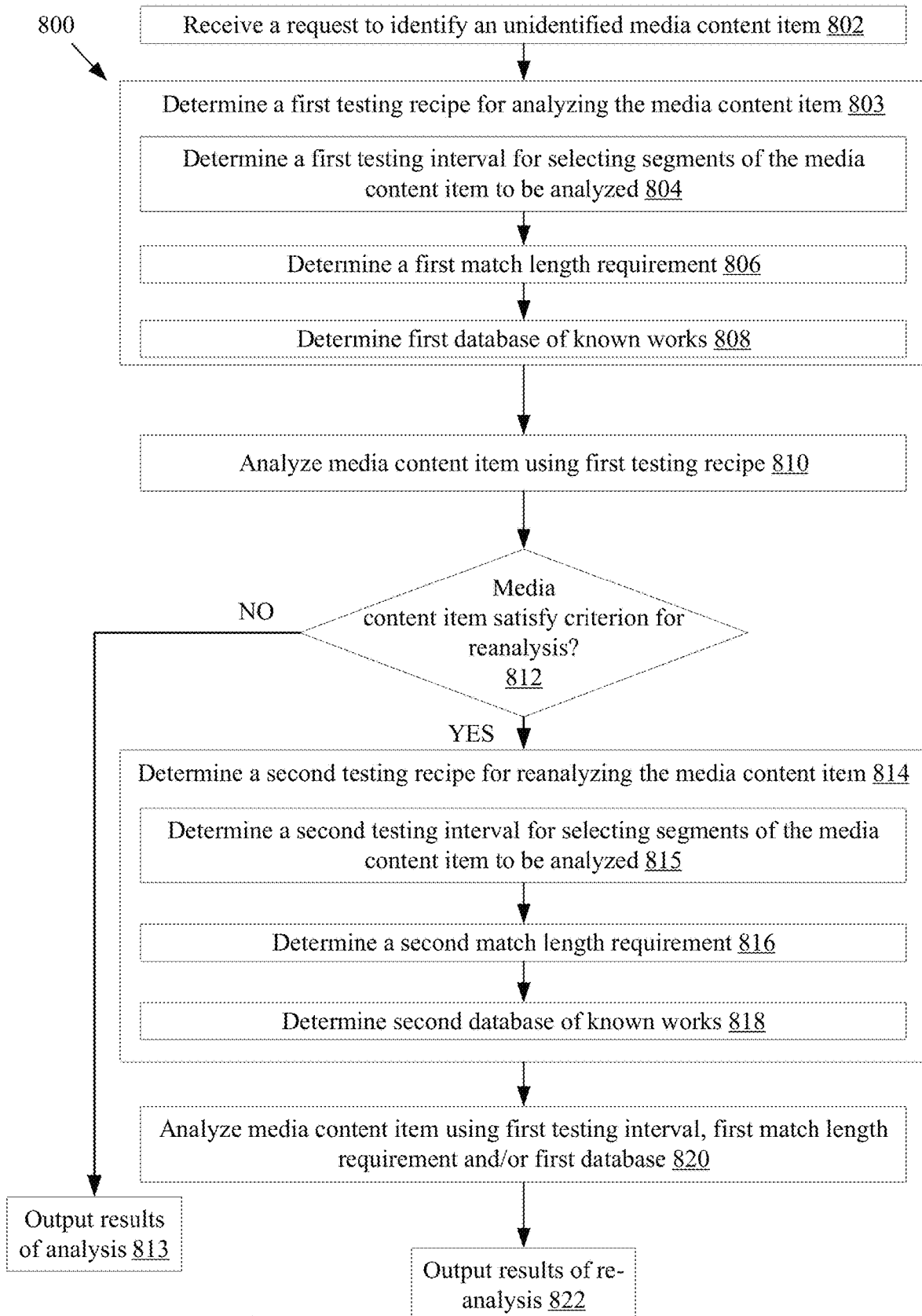
FIG. 8 is a flow diagram illustrating a method for analyzing and reanalyzing a media content item, according to an embodiment.

FIG. 8 is a flow diagram illustrating one embodiment of a method 800 for analyzing/testing an unidentified media content item to identify portions of known media content items contained therein, according to embodiments of the present disclosure. At block 802 of method 800, processing logic receives a request to test/analyze an unidentified media content item. The request may be received from additional processing logic hosted by a same computing device as the processing logic executing the method. Alternatively, the request may be received from a remote computing device. The request may include a copy of the unidentified media content item, a copy of a segment of the media content item, a digital fingerprint of the media content item, or a digital fingerprint of a segment of a media content item. In one embodiment, the media content item is a live stream, and the live stream is periodically analyzed. For example, a segment of the live stream may be analyzed every few minutes.

At block 803, processing logic determines a first testing recipe to use for analyzing the media content item. This may include determining a first testing interval at block 804, determining a first match length requirement at block 806 and/or determining a first database of known works to use at block 808. The determined first testing recipe may also include any of the other testing parameters discussed hereinabove, such as an interval adjustment factor and/or interval adjustment rules, segment size, rewind criteria, rewind value, and so on.

At block 810, processing logic analyzes the media content item using the first testing recipe (e.g., including the first testing interval, first match length requirement, first database and/or other parameters). In one embodiment, the analysis of the media content item is performed according to method 300.

At block 812, processing logic assesses a result of the analysis performed at block 810, and determines whether the media content item satisfies a criterion for reanalysis based on the result of the performed analysis. For example, if a threshold number of matches to known media content items were found from the first analysis and a threshold portion of the media content item was not tested, then the reanalysis criterion may be satisfied. If the reanalysis criterion is satisfied, the method continues to block 814. Otherwise, the method proceeds to block 813 and the results of the analysis are output.

At block 814, processing logic determines a second testing recipe for reanalyzing the media content item. This may include determining a second testing interval at block 815, determining a second match length requirement at block 816 and/or determining a second database of known works to use at block 818. The determined second testing recipe may also include any of the other testing parameters discussed hereinabove, such as an interval adjustment factor and/or interval adjustment rules, segment size, rewind criteria, rewind value, and so on. The initial testing interval, rules for adjusting the testing interval and/or interval adjustment factor for the second testing recipe may be different than those for the first testing recipe. For example, the second testing recipe may have a shorter initial interval than the first testing recipe, the rules for the second testing recipe may require more misses before increasing the testing interval than those of the first testing recipe, and/or the interval adjustment factor for the second testing recipe may adjust the testing interval by a lesser amount than those of the first testing recipe. Additionally, or alternatively, the second testing recipe may use a larger database of known works for comparison than is used for the first testing recipe. Additionally, or alternatively, the second testing recipe may use a smaller segment size and/or match length requirement than the first testing recipe. Each of these factors may increase the chance of identifying copyrighted material, at the expense of the use of additional compute resources. Accordingly, in embodiments the more thorough second testing recipe is applied after determining that there is a high probability that additional unidentified known media content items are included in the unidentified media content item (e.g., UGC) after the first analysis is performed.

At block 820, processing logic analyzes the media content item using the second testing recipe (e.g., including the second testing interval, second match length requirement, second database and/or other parameters). In one embodiment, the reanalysis of the media content item is performed according to method 300, but using the second testing recipe.

At block 822 the results of the reanalysis are output.

Figure 9:
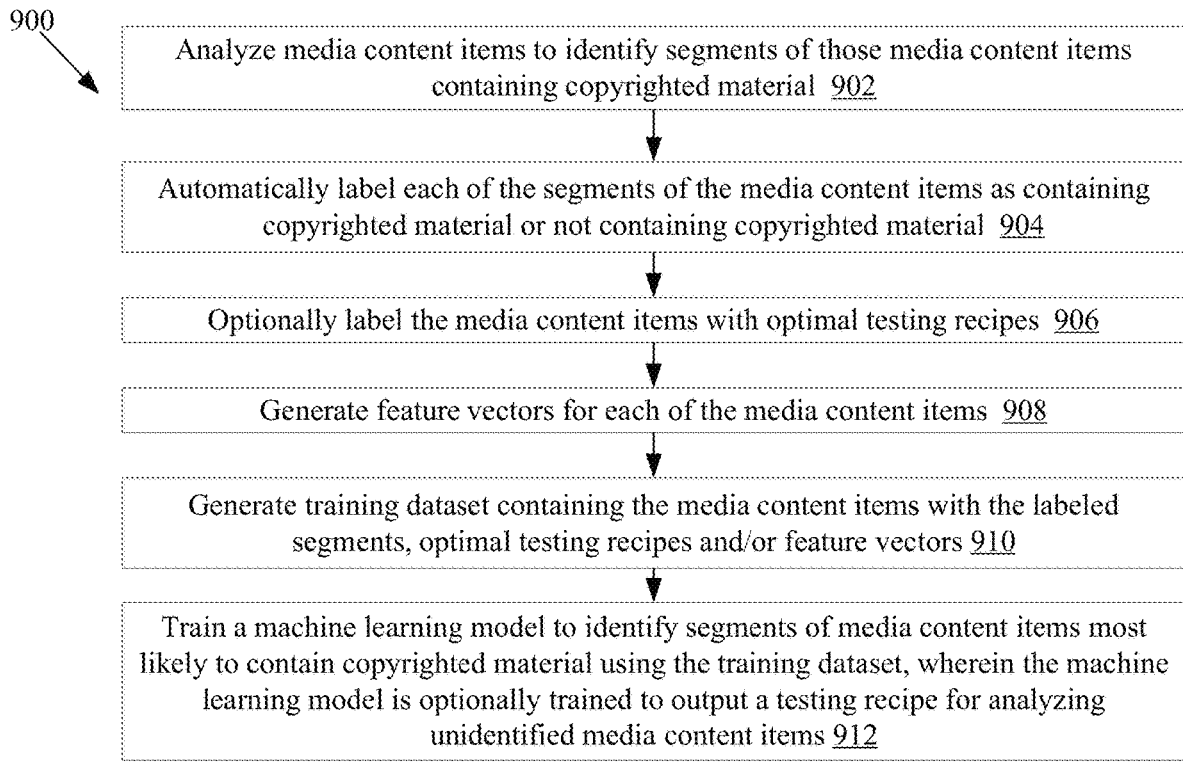
FIG. 9 is a flow diagram illustrating a method for training a machine learning model to determine segments of media content items most likely to contain copyrighted material and/or to generate testing recipes for analyzing media content items, according to an embodiment.

FIG. 9 is a flow diagram illustrating one embodiment of a method 900 for training a machine learning model to identify segments of media content items most likely to contain copyrighted material, according to embodiments of the present disclosure. Method 900 may be performed by processing logic that comprises hardware (e.g., circuitry, dedicated logic, programmable logic, microcode, etc.), software (e.g., instructions run on a processor), firmware, or a combination thereof. Method 900 may be performed, for example by one or more of computing devices 101A-B and/or server computing device 150 of FIG. 1 in embodiments.

At block 902 of method 900, processing logic analyzes media content items to identify segments of those media content items containing copyrighted material. The analysis performed to identify those segments containing copyrighted material may be a thorough analysis that analyzes every segment of the media content items.

At block 904, processing logic automatically labels each of the segments of the media content item as containing copyrighted material or not containing copyrighted material, as appropriate. At block 906, processing logic may additionally label the media content items with optimal testing recipes that would identify each of the segments that contain copyrighted material.

At block 908, processing logic generates feature vectors (i.e., embeddings) for each of the media content items. The embeddings may be the same digital fingerprints that are used for comparison, or may be different from the digital fingerprints. For media content items that contain audio and video, the embeddings may include audio features as well as video features. At block 910, processing logic generates a training dataset containing multiple training data items. Each training data item may include a media content item with labeled segments and/or the embeddings of those media content items with the labeled segments. Training data items may additionally include a label of an optimal testing recipe for testing the associated media content item of that training data item.

At block 912, a machine learning model is trained to identify segments of media content items most likely to contain copyrighted material using the training dataset. The machine learning model may additionally or alternatively be trained to output a testing recipe for analyzing an unknown media content item. The machine learning model may be, for example, a neural network such as a convolutional neural network, a deep network, a recurrent neural network, or other type of machine learning model.

Figure 10:
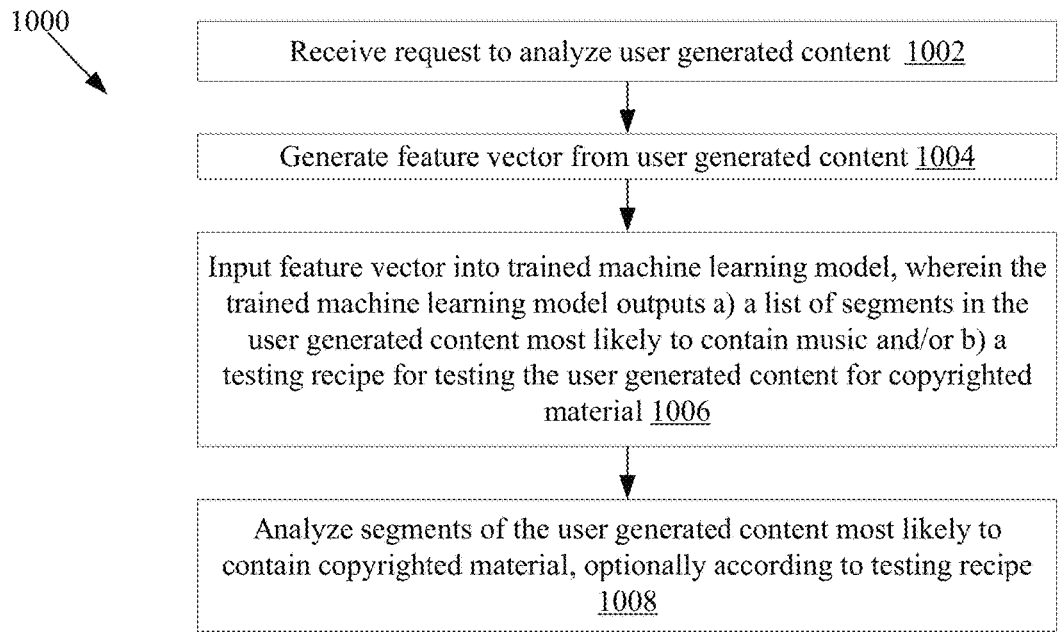
FIG. 10 is a flow diagram illustrating a method for analyzing a media content item using a trained machine learning model in order to determine segments of media content items to analyze and/or to determine a testing recipe for analyzing the media content item, according to an embodiment.

FIG. 10 is a flow diagram illustrating one embodiment of a method 1000 for using a trained machine learning model to identify segments of media content items most likely to contain copyrighted material, according to embodiments of the present disclosure. Method 1000 may be performed by processing logic that comprises hardware (e.g., circuitry, dedicated logic, programmable logic, microcode, etc.), software (e.g., instructions run on a processor), firmware, or a combination thereof. Method 1000 may be performed, for example by one or more of computing devices 101A-B and/or server computing device 150 of FIG. 1 in embodiments.

At block 1002 of method 1000, processing logic receives a request to analyze an unidentified media content item (e.g., UGC). At block 1004, processing logic generates a feature vector or embedding from the media content item. For media content items that contain audio and video, the embeddings may include audio features as well as video features.

At block 1006, processing logic inputs the feature vector or embedding into the trained machine learning model. The trained machine learning model then ouputs a) an indication of locations in the media content item most likely to contain copyrighted material and/or b) a testing recipe most likely to identify copyrighted material in the media content item in a most efficient manner possible. If the output of the machine learning model is the indication of locations likely to contain copyrighted material, then this information may be used to select or generate a testing recipe for testing that media content item.

In some embodiments, the machine learning model is a recurrent neural network, and the embedding of an unknown media content item is divided into sequential segments, which are processed by the recurrent neural network in sequential order to generate an output.

At block 1008, processing logic analyzes a subset of segments of the user generated content/unidentified media content item using a testing recipe. The testing recipe may have been output by the trained machine learning model.

Figure 11:
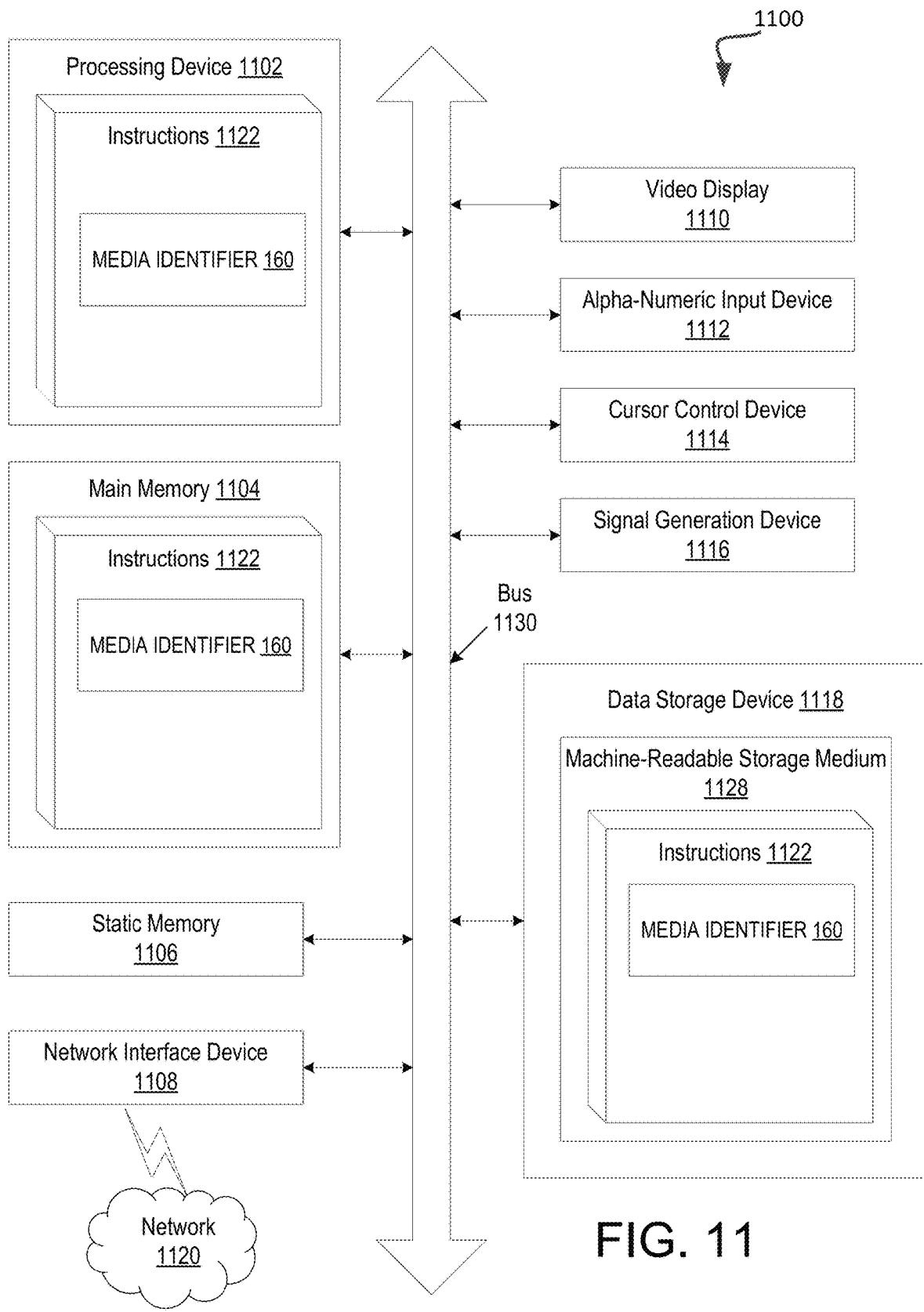
FIG. 11 is a block diagram illustrating an exemplary computer system, according to an embodiment.

FIG. 11 illustrates a diagrammatic representation of a machine in the exemplary form of a computing device 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computing device 1100 may represent computing devices 101A-B, and/or server computing device 150, as shown in FIG. 1.

The computing device 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. The processing device 1102 is configured to execute the media identifier 160 for performing the operations and steps discussed herein.

The computing device 1100 may further include a network interface device 1108. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of media identifier 160) embodying any one or more of the methodologies or functions described herein. The instructions 1122 may also reside, completely or at least partially, within the main memory 1104 and/or within processing logic 1126 of the processing device 1102 during execution thereof by the computing device 1100 (also referred to as a computer system), the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "comparing", "selecting", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. In addition, embodiments of the present disclosure are not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, from a media content sharing platform, by a processing device, a request to analyze a media content item, wherein the request comprises at least one of one or more segments of the media content item or digital fingerprints of the one or more segments of the media content item;
analyzing, by the processing device, the media content item to identify copyrighted material contained therein, wherein analyzing the media content item comprises performing a dynamic throttling of a sampling frequency by:
determining, by the processing device, an initial interval for selecting segments of the media content item to be analyzed, wherein the initial interval corresponds to an initial sampling frequency, and wherein the initial interval reflects an amount of time between the segments;
determining, by the processing device, a first digital fingerprint of a first segment of the media content item;
comparing, by the processing device, the first digital fingerprint to at least a first subset of a plurality of digital fingerprints of a first plurality of known works to determine whether the first digital fingerprint matches one of the plurality of digital fingerprints of the first plurality of known works;
determining, by the processing device, based on the comparing of the first digital fingerprint to at least the first subset of the plurality of digital fingerprints of the first plurality of known works, that the first digital fingerprint fails to match any of the plurality of digital fingerprints of the first plurality of known works;
determining, by the processing device, an updated interval for selecting the segments of the media content item to be analyzed, wherein the updated interval is longer than the initial interval based on the first digital fingerprint failing to match any of the plurality of digital fingerprints of the first plurality of known works, and wherein the updated interval corresponds to an updated sampling frequency that is less frequent than the initial sampling frequency;
determining, by the processing device, a second digital fingerprint of a second segment of the media content item, wherein the second segment is separated from the first segment by the updated interval;
comparing, by the processing device, the second digital fingerprint to at least a second subset of the plurality of digital fingerprints of the first plurality of known works to determine that the second digital fingerprint matches one of the plurality of digital fingerprints of the first plurality of known works; and
identifying, by the processing device, based on the comparing, the copyrighted material in the media content item, wherein the copyrighted material corresponds to the second digital fingerprint; and
responsive to identifying the copyrighted material in the media content item, sending, by the processing device, to the media content sharing platform, an instruction to remove at least a portion of the media content item, wherein the portion of the media content item comprises the copyrighted material.

2. The method of claim 1, further comprising:
determining, based on the comparing of the first digital fingerprint to at least the first subset of plurality of digital fingerprints of the first plurality of known works, that the first digital fingerprint matches one of the plurality of digital fingerprints of the first plurality of known works;
wherein the updated interval is a shorter interval than the initial interval.

3. The method of claim 2, wherein the first segment is at a first time offset into the media content item, the method further comprising:
generating a third digital fingerprint of a third segment of the media content item, wherein the third segment is at a second time offset that is before the first time offset; and comparing the third digital fingerprint to at least a third subset of the plurality of digital fingerprints of the first plurality of known works to determine whether the third digital fingerprint matches one of the plurality of digital fingerprints of the first plurality of known works.

4. The method of claim 1, further comprising:
determining a number of matches between digital fingerprints of selected segments of the media content item and members of the plurality of digital fingerprints of the first plurality of known works as a result of analyzing the media content item;
determining that the number of matches meets or exceeds a threshold; and
reanalyzing the media content item using a new interval for selecting segments of the media content item to be analyzed, wherein the new interval is a shorter interval than the initial interval.

5. The method of claim 1, wherein the analyzing of the media content item is performed using a first match length requirement, the method further comprising:
determining a number of matches between digital fingerprints of selected segments of the media content item and members of the plurality of digital fingerprints of the first plurality of known works as a result of analyzing the media content item, wherein each of the matches has at least of a first duration in accordance with the first match length requirement;
determining that the number of matches meets or exceeds a threshold; and
reanalyzing the media content item using a second match length requirement, wherein the second match length requirement is shorter than the first match length requirement.

6. The method of claim 1, wherein the analyzing of the media content item is performed using a first database comprising the first plurality of known works, the method further comprising:
determining a number of matches between digital fingerprints of selected segments of the media content item and members of the plurality of digital fingerprints of the first plurality of known works as a result of analyzing the media content item;
determining that the number of matches meets or exceeds a threshold; and
reanalyzing the media content item using a second database comprising a second plurality of known works, wherein the second plurality of known works contains more known works than the first plurality of known works.

7. The method of claim 1, further comprising:
determining at least one of a user account or a channel associated with the media content item, wherein the initial interval is determined based at least in part on the user account or the channel.

8. The method of claim 7, further comprising:
determining, for at least one of the user account or the channel, historical information about amounts of copyrighted material contained within previous media content items associated with at least one of the user account or the channel, wherein the initial interval is determined based at least in part on the historical information.

9. The method of claim 1, further comprising:
determining a number of views of the media content item;
determining that the number of views meets or exceeds a threshold; and
reanalyzing the media content item using a new interval for selecting segments of the media content item to be analyzed, wherein the new interval is a shorter interval than the initial interval.

10. The method of claim 1, further comprising:
determining a plurality of sets of features of the media content item, wherein each set of features of the plurality of sets of features is associated with a different segment of the media content item;
processing each set of features of the plurality of sets of features using a trained machine learning model trained to classify segments of media content items as containing music or as not containing music, wherein the trained machine learning model outputs, for each set of features, a first classification of containing music or a second classification of not containing music;
determining those segments of the media content item containing music, wherein all segments of the media content item that are selected to be analyzed have the first classification of containing music.

11. The method of claim 1, further comprising:
determining whether one or more initially selected segments of the media content item contain copyrighted material; and
determining the initial interval based on an amount of the one or more initially selected segments of the media content item that contain copyrighted material.

12. The method of claim 11, wherein the one or more initially selected segments include a beginning segment at or near a beginning of the media content item, a middle segment at or near a middle of the media content item, and an end segment at or near an end of the media content item.

13. The method of claim 1, further comprising:
determining a length of the media content item;
wherein the initial interval is determined based at least in part on the length of the media content item.

14. A computer readable medium comprising instructions that, when executed by a processing device, cause the processing device to perform operations comprising:
receiving, from a media content sharing platform, a request to analyze a media content item, wherein the request comprises at least one of one or more segments of the media content item or digital fingerprints of the one or more segments of the media content item;
analyzing the media content item to identify copyrighted material contained therein, wherein analyzing the media content item comprises performing a dynamic throttling of a sampling frequency by:
determining an initial interval for selecting segments of the media content item to be analyzed, wherein the initial interval corresponds to an initial sampling frequency, and wherein the initial interval reflects an amount of time between the segments;
determining a first digital fingerprint of a first segment of the media content item;
comparing the first digital fingerprint to at least a first subset of a plurality of digital fingerprints of a first plurality of known works to determine whether the first digital fingerprint matches one of the plurality of digital fingerprints of the first plurality of known works;
determining, based on the comparing of the first digital fingerprint to at least the first subset of the plurality of digital fingerprints of the first plurality of known works, that the first digital fingerprint fails to match any of the plurality of digital fingerprints of the first plurality of known works determining an updated interval for selecting the segments of the media content item to be analyzed, wherein the updated interval is longer than the initial interval based on the first digital fingerprint failing to match any of the plurality of digital fingerprints of the first plurality of known works, and wherein the updated interval corresponds to an updated sampling frequency that is less frequent than the initial sampling frequency;

determining a second digital fingerprint of a second segment of the media content item, wherein the second segment is separated from the first segment by the updated interval;

comparing the second digital fingerprint to at least a second subset of the plurality of digital fingerprints of the first plurality of known works to determine that the second digital fingerprint matches one of the plurality of digital fingerprints of the first plurality of known works; and identifying, based on the comparing, the copyrighted material in the media content item, wherein the copyrighted material corresponds to the second digital fingerprint; and responsive to identifying the copyrighted material in the media content item, sending, to the media content sharing platform, an instruction to remove at least a portion of the media content item, wherein the portion of the media content item comprises the copyrighted material.

15. The computer readable medium of claim 14, the operations further comprising:

determining, based on the comparing of the first digital fingerprint to at least the first subset of plurality of digital fingerprints of the first plurality of known works, that the first digital fingerprint matches one of the plurality of digital fingerprints of the first plurality of known works;

wherein the updated interval is a shorter interval than the initial interval.

16. The computer readable medium of claim 15, wherein the first segment is at a first time offset into the media content item, the operations further comprising:

generating a third digital fingerprint of a third segment of the media content item, wherein the third segment is at a second time offset that is before the first time offset; and comparing the third digital fingerprint to at least a third subset of the plurality of digital fingerprints of the first plurality of known works to determine whether the third digital fingerprint matches one of the plurality of digital fingerprints of the first plurality of known works.

17. The computer readable medium of claim 14, the operations further comprising:

determining a number of matches between digital fingerprints of selected segments of the media content item and members of the plurality of digital fingerprints of the first plurality of known works as a result of analyzing the media content item;

determining that the number of matches meets or exceeds a threshold; and reanalyzing the media content item using a new interval for selecting segments of the media content item to be analyzed, wherein the new interval is a shorter interval than the initial interval.

18. The computer readable medium of claim 14, wherein the analyzing of the media content item is performed using a first match length requirement, the operations further comprising:

determining a number of matches between digital fingerprints of selected segments of the media content item and members of the plurality of digital fingerprints of the first plurality of known works as a result of analyzing the media content item, wherein each of the matches has at least of a first duration in accordance with the first match length requirement;

determining that the number of matches meets or exceeds a threshold; and reanalyzing the media content item using a second match length requirement, wherein the second match length requirement is shorter than the first match length requirement.

19. The computer readable medium of claim 14, wherein the analyzing of the media content item is performed using a first database comprising the first plurality of known works, the operations further comprising:

determining a number of matches between digital fingerprints of selected segments of the media content item and members of the plurality of digital fingerprints of the first plurality of known works as a result of analyzing the media content item;

determining that the number of matches meets or exceeds a threshold; and reanalyzing the media content item using a second database comprising a second plurality of known works, wherein the second plurality of known works contains more known works than the first plurality of known works.

20. The computer readable medium of claim 14, the operations further comprising:

determining at least one of a user account or a channel associated with the media content item, wherein the initial interval is determined based at least in part on the user account or the channel.

21. The computer readable medium of claim 20, the operations further comprising:

determining, for at least one of the user account or the channel, historical information about amounts of copyrighted material contained within previous media content items associated with at least one of the user account or the channel, wherein the initial interval is determined based at least in part on the historical information.

22. The computer readable medium of claim 14, the operations further comprising:

determining a number of views of the media content item;

determining that the number of views meets or exceeds a threshold; and reanalyzing the media content item using a new interval for selecting segments of the media content item to be analyzed, wherein the new interval is a shorter interval than the initial interval.

23. The computer readable medium of claim 14, the operations further comprising:

determining a plurality of sets of features of the media content item, wherein each set of features of the plurality of sets of features is associated with a different segment of the media content item;

processing each set of features of the plurality of sets of features using a trained machine learning model trained to classify segments of media content items as containing music or as not containing music, wherein the trained machine learning model outputs, for each set of features, a first classification of containing music or a second classification of not containing music;

determining those segments of the media content item containing music, wherein all segments of the media content item that are selected to be analyzed have the first classification of containing music.

24. The computer readable medium of claim 14, the operations further comprising:

determining whether one or more initially selected segments of the media content item contain copyrighted material; and determining the initial interval based on an amount of the one or more initially selected segments of the media content item that contain copyrighted material.

25. The computer readable medium of claim 24, wherein the one or more initially selected segments include a beginning segment at or near a beginning of the media content item, a middle segment at or near a middle of the media content item, and an end segment at or near an end of the media content item.

26. The computer readable medium of claim 14, the operations further comprising:

determining a length of the media content item;

wherein the initial interval is determined based at least in part on the length of the media content item.

27. A system comprising:

a memory; and a processing device operatively coupled to the memory, the processing device to:

receive, from a media content sharing platform, a request to analyze a media content item, wherein the request comprises at least one of one or more segments of the media content item or digital fingerprints of the one or more segments of the media content item;

analyze the media content item to identify copyrighted material contained therein, wherein analyzing the media content item comprises performing a dynamic throttling of a sampling frequency, and wherein to analyze the media content item the processing device is further to:

determine an initial interval for selecting segments of the media content item to be analyzed, wherein the initial interval corresponds to an initial sampling frequency, wherein the initial interval reflects an amount of time between the segments;

determine a first digital fingerprint of a first segment of the media content item;

compare the first digital fingerprint to at least a first subset of a plurality of digital fingerprints of a first plurality of known works to determine whether the first digital fingerprint matches one of the plurality of digital fingerprints of the first plurality of known works;

determine, based on the comparing of the first digital fingerprint to at least the first subset of the plurality of digital fingerprints of the first plurality of known works, that the first digital fingerprint fails to match any of the plurality of digital fingerprints of the first plurality of known works;

determine an updated interval for selecting the segments of the media content item to be analyzed, wherein the updated interval is longer than the initial interval the first digital fingerprint failing to match any of the plurality of digital fingerprints of the first plurality of known works, and wherein the updated interval corresponds to an updated sampling frequency that is less frequent than the initial sampling frequency;

determine a second digital fingerprint of a second segment of the media content item, wherein the second segment is separated from the first segment by the updated interval;

compare the second digital fingerprint to at least a second subset of the plurality of digital fingerprints of the first plurality of known works to determine that the second digital fingerprint matches one of the plurality of digital fingerprints of the first plurality of known works; and identifying, based on the comparing, the copyrighted material in the media content item, wherein the copyrighted material corresponds to the second digital fingerprint; and in response to identifying the copyrighted material in the media content item, send, to the media content sharing platform, an instruction to remove at least a portion of the media content item, wherein the portion of the media content item comprises the copyrighted material.

\* \* \* \* \*